(12) United States Patent  
Asai

(10) Patent No.: US 10,388,972 B2  
(45) Date of Patent: Aug. 20, 2019

(54) FUEL CELL SYSTEM AND CONTROL METHOD THEREOF

(71) Applicant: NISSAN MOTOR CO., LTD., Yokohama-shi, Kanagawa (JP)

(72) Inventor: Yoshitomo Asai, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 29 days.

(21) Appl. No.: 15/522,393

(22) PCT Filed: Sep. 17, 2015

(86) PCT No.: PCT/JP2015/076563  
§ 371 (c)(1),  
(2) Date: Apr. 27, 2017

(87) PCT Pub. No.: WO2016/067789  
PCT Pub. Date: May 6, 2016

(65) Prior Publication Data  
US 2018/0006319 A1 Jan. 4, 2018

(30) Foreign Application Priority Data  
Oct. 28, 2014 (JP) ................................ 2014-219717

(51) Int. Cl.  
*H01M 8/04119* (2016.01)  
*H01M 8/04* (2016.01)  
(Continued)

(52) U.S. Cl.  
CPC ......... *H01M 8/04179* (2013.01); *H01M 8/04* (2013.01); *H01M 8/04201* (2013.01);  
(Continued)

(58) Field of Classification Search  
CPC . H01M 8/04179; H01M 8/04; H01M 8/04201  
See application file for complete search history.

(56) References Cited

U.S. PATENT DOCUMENTS 9,876,242 B2 * 1/2018 Asai ....................... H01M 8/04  
2009/0035614 A1 2/2009 Wake et al.  
(Continued)

FOREIGN PATENT DOCUMENTS

JP 2008-41329 A 2/2008  
JP 2008-97973 4/2008  
(Continued)

*Primary Examiner* — Abdullah A Riyami  
*Assistant Examiner* — Nader J Alhawamdeh  
(74) *Attorney, Agent, or Firm* — Foley & Lardner LLP

(57) ABSTRACT

In order to improve estimation accuracy of a purging amount, a fuel cell system comprises a supply valve that controls a supply of an anode gas into an anode system, a purge valve that discharges an off-gas from the anode system, a pressure detecting unit configured to estimate or measures a pressure inside the anode system, and a purging amount estimating unit configured to estimate a purging amount of the off-gas discharged from the anode system through the purge valve based on a pressure change inside the anode system during a purge valve close duration in a supply valve open state and a pressure change inside the anode system during a purge valve close duration in a supply valve close state.

12 Claims, 22 Drawing Sheets

(51) Int. Cl.
  *H01M 8/04082* (2016.01)
  *H01M 8/0438* (2016.01)
  *H01M 8/04746* (2016.01)
  *H01M 8/0432* (2016.01)

(52) U.S. Cl.
  CPC ... *H01M 8/04388* (2013.01); *H01M 8/04402* (2013.01); *H01M 8/04753* (2013.01); *H01M 8/04761* (2013.01); *H01M 8/0432* (2013.01); *H01M 2250/20* (2013.01); *Y02T 90/32* (2013.01)

(56) References Cited

U.S. PATENT DOCUMENTS

| | | | |
|---|---|---|---|
| 2012/0156575 A1 | 6/2012 | Di Fiore et al. | |
| 2015/0017562 A1* | 1/2015 | Ichikawa | H01M 8/04231 429/446 |
| 2015/0044582 A1* | 2/2015 | Chikugo | H01M 8/04089 429/411 |
| 2017/0373334 A1* | 12/2017 | Asai | H01M 8/04402 |
| 2018/0006319 A1* | 1/2018 | Asai | H01M 8/04 |

FOREIGN PATENT DOCUMENTS

| | | | | |
|---|---|---|---|---|
| JP | 2009-37951 A | 2/2009 | | |
| JP | 2009-193838 A | 8/2009 | | |
| JP | WO 2013129453 A1 * | 9/2013 | ........ | H01M 8/04231 |
| WO | WO 2013/137271 A1 | 9/2013 | | |

* cited by examiner

FUEL CELL SYSTEM AND CONTROL METHOD THEREOF

TECHNICAL FIELD

This invention relates to a fuel cell system and control method thereof.

BACKGROUND ART

US 2012/0,156,575A discloses a fuel cell system, in which a gas amount discharged from the anode system is computed based on a pressure change inside the anode system in the downstream from the hydrogen supply valve while a supply of hydrogen to the fuel cell stops by closing the hydrogen supply valve.

SUMMARY OF INVENTION

While the purge valve is closed during the operation of the fuel cell system, nitrogen and the like transmitted from the cathode of the fuel cell to the anode through an electrolytic membrane are accumulated in the anode system, so that the hydrogen concentration inside the anode system gradually decreases. As the hydrogen concentration inside the anode system decreases, a voltage drop occurs during the operation of the fuel cell system.

In order to prevent such a voltage drop, the off-gas containing nitrogen or hydrogen is discharged from the inside of the anode system through the purge valve by opening the purge valve as necessary, so that the hydrogen concentration inside the anode system is maintained such that the voltage drop does not occur. Here, if the amount of the off-gas (purging amount) discharged from the inside of the anode system through the purge valve is estimated with high accuracy, it is possible to consider whether the hydrogen concentration inside the anode system is properly maintained or not. Because the hydrogen concentration inside the anode system, depends on the purging amount, increases with increasing of the purging amount.

However, the gas discharged from the inside of the anode system computed through a method of the related art described above contains a gas leaking from the inside of the anode system in addition to the purge gas purged through the purge valve. The gas leaking from the inside of the anode system is typically hydrogen transmitting from the anode of the fuel cell to the cathode through the electrolytic membrane. As hydrogen transmits from the anode of the fuel cell to the cathode, the hydrogen concentration inside the anode system decreases.

That is, while the purge gas contributes to an increase of the hydrogen concentration inside the anode system, the transmitted hydrogen contributes to a decrease of the hydrogen concentration inside the anode system.

Therefore, in order to manage the hydrogen concentration based on the gas amount discharged from the inside of the anode system computed through a method of the related art, the hydrogen concentration unanticipatedly decreases due to an influence of the hydrogen leaking from the inside of the anode system, so that an unanticipated voltage drop may occur.

The purpose of this invention has been made to estimate the amount of the off-gas discharged from the inside of the anode system through the purge valve with high accuracy by excluding an influence of factors that change a pressure inside the anode system in addition to the purging, particularly, an influence of the hydrogen leaking from the inside of the anode system.

According to an aspect of this invention, there is provided a fuel cell system having a fuel cell supplied with an anode gas and a cathode gas to generate electricity from the fuel cell depending on a load. The fuel cell system comprises a supply valve for supplying the anode gas into an anode system of the fuel cell system, a purge valve for discharging an off-gas from the anode system, a pressure detecting unit configured to estimate or measures a pressure inside the anode system, and a supply valve control unit configured to estimate a purging amount of the off-gas discharged from the anode system through the purge valve based on a pressure change inside the anode system during a purge valve close duration in a supply valve open state and a pressure change inside the anode system during a purge valve close duration in a supply valve close state.

DESCRIPTION OF EMBODIMENTS

Hereinafter, an embodiment of this invention will be described with reference to the accompanying drawings.

First Embodiment

A fuel cell is composed by interposing an electrolytic membrane between an anode (fuel electrode) and a cathode (oxidant electrode). The fuel cell generates electricity by supplying an anode gas (fuel gas) containing hydrogen to the anode and a cathode gas (oxidant gas) containing oxygen to the cathode. Electrode reactions generated in both the anode and the cathode are expressed as follows.

anode: $2H_2 \rightarrow 4H^+ + 4e^-$  (1)

cathode: $4H^+ + 4e^- + O_2 \rightarrow 2H_2O$  (2)

Through the electrode reactions (1) and (2), the fuel cell generates an electromotive force of approximately 1 V.

In order to use such a fuel cell as a power source of a vehicle, a fuel cell stack obtained by stacking several hundreds of fuel cells is employed because high electric power is necessary. In addition, a fuel cell system is provided to supply the anode gas and the cathode gas to the fuel cell stack, so that electric power for driving a vehicle is extracted.

Figure 1:
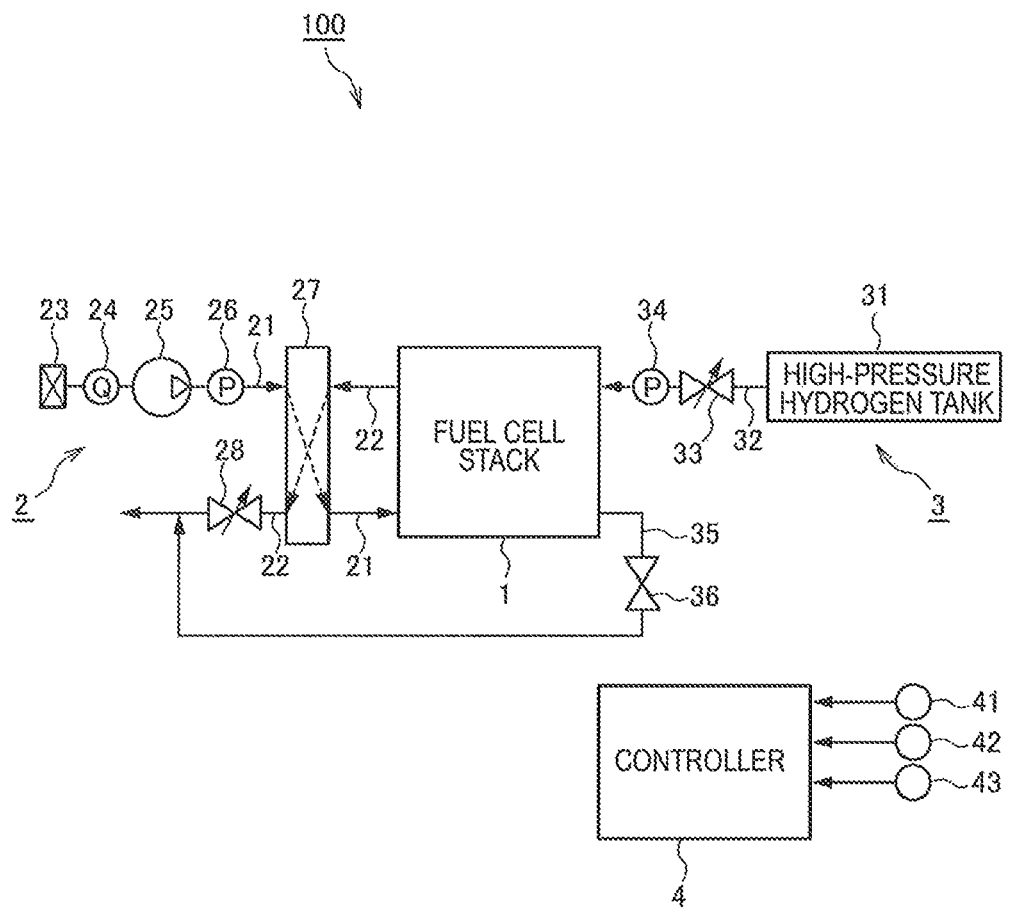
FIG. 1 is a schematic configuration diagram illustrating a fuel cell system according to the first embodiment of this invention.

FIG. 1 is a schematic configuration diagram illustrating a fuel cell system 100 according to an embodiment of this invention.

The fuel cell system 100 comprises a fuel cell stack 1, a cathode gas supply/discharge unit 2, an anode gas supply/discharge unit 3, and a controller 4.

The fuel cell stack 1 is obtained by stacking a plurality of fuel cells. The fuel cell stack 1 is supplied with an anode gas and a cathode gas to generate electric power necessary to drive a vehicle.

The cathode gas supply/discharge unit 2 comprises a cathode gas supply passage 21, a cathode gas discharge passage 22, a filter 23, an air flow sensor 24, a cathode compressor 25, a cathode pressure sensor 26, a water recovery device (hereinafter, referred to as a "WRD") 27, and a cathode pressure control valve 28. The cathode gas supply/discharge unit 2 supplies the fuel cell stack 1 with the cathode gas and discharges the cathode off-gas discharged from the fuel cell stack 1 to the exterior.

The cathode gas supply passage 21 is a passage for flowing the cathode gas supplied to the fuel cell stack 1. One end of the cathode gas supply passage 21 is connected to the filter 23, and the other end is connected to the cathode gas inlet hole of the fuel cell stack 1.

The cathode gas discharge passage 22 is a passage for flowing the cathode off-gas discharged from the fuel cell stack 1. One end of the cathode gas discharge passage 22 is connected to the cathode gas outlet hole of the fuel cell stack 1, and the other end is opened. The cathode off-gas is a mixture gas between the cathode gas and water vapor generated through the electrode reactions.

The filter 23 is used to remove a foreign object out of the cathode gas input to cathode gas supply passage 21.

The air flow sensor 24 is provided in the cathode gas supply passage 21 in the upstream from the cathode compressor 25. The air flow sensor 24 detects a flow rate of the cathode gas supplied to the cathode compressor 25 and supplied finally to the fuel cell stack 1.

The cathode compressor 25 is provided in the cathode gas supply passage 21. The cathode compressor 25 inputs the air (the atmospheric air) as a cathode gas to the cathode gas supply passage 21 through the filter 23 and supplies it to the fuel cell stack 1.

The cathode pressure sensor 26 is provided in the cathode gas supply passage 21 between the cathode compressor 25 and the WRD 27. The cathode pressure sensor 26 detects a pressure of the cathode gas supplied to the fuel cell stack 1 (hereinafter, referred to as a "cathode pressure").

The WRD 27 is connected to each of the cathode gas supply passage 21 and the cathode gas discharge passage 22 to recover moisture in the cathode off-gas flowing through the cathode gas discharge passage 22 and use the recovered moisture to humidify the cathode gas flowing through the cathode gas supply passage 21.

The cathode pressure control valve 28 is provided in the cathode gas discharge passage 22 in the downstream from the WRD 27. The open/close state of the cathode pressure control valve 28 is controlled by the controller 4 to control a pressure of the cathode gas supplied to the fuel cell stack 1. It is noted that, according to this embodiment, the cathode pressure is controlled to a desired pressure (target cathode pressure) basically by adjusting a rotation speed of the cathode compressor 25 and an opening level of the cathode pressure control valve 28.

The anode gas supply/discharge unit 3 supplies the fuel cell stack 1 with the anode gas and discharges the anode off-gas discharged from the fuel cell stack 1 into the cathode gas discharge passage 22. The anode gas supply/discharge unit 3 comprises a high-pressure hydrogen tank 31, an anode gas supply passage 32, a hydrogen supply valve 33, an anode pressure sensor 34, an anode gas discharge passage 35, and a purge valve 36.

The high-pressure hydrogen tank 31 maintains and stores the anode gas supplied to the fuel cell stack 1 in a high pressure state.

The anode gas supply passage 32 is a passage for supplying the anode gas discharged from the high-pressure hydrogen tank 31 to the fuel cell stack 1. One end of the anode gas supply passage 32 is connected to the high-pressure hydrogen tank 31, and the other end is connected to the anode gas inlet hole of the fuel cell stack 1.

The hydrogen supply valve 33 is provided in the anode gas supply passage 32. The open/close operation of the hydrogen supply valve 33 is controlled by the controller 4 to adjust a pressure of the anode gas supplied to the fuel cell stack 1 to a desired pressure. In addition, by controlling the open/close operation of the hydrogen supply valve 33, the flow rate of the anode gas supplied to the fuel cell stack 1 is also controlled.

The anode pressure sensor 34 is provided in the anode gas supply passage 32 in the downstream from the hydrogen supply valve 33. The anode pressure sensor 34 is a pressure inspection section detects a pressure of the anode gas supply passage 32 in the downstream from the hydrogen supply valve 33. According to this embodiment, the pressure detected by the anode pressure sensor 34 is used as a pressure inside the anode system (hereinafter, referred to as an "anode pressure") from the hydrogen supply valve 33 to the purge valve 36.

The anode gas discharge passage 35 is a passage for flowing the anode off-gas discharged from the fuel cell stack 1. The anode off-gas is a mixture gas between the remaining hydrogen (anode gas) not used in the electrode reactions, and nitrogen or water vapor transmitted from the cathode side to the anode side through an electrolytic membrane. One end of the anode gas discharge passage 35 is connected to the anode gas outlet hole of the fuel cell stack 1, and the other end is connected to the cathode gas discharge passage 22.

The anode off-gas discharged to the cathode gas discharge passage 22 is mixed with the cathode off-gas in the cathode gas discharge passage 22 and is discharged to the outside of the fuel cell system 100. Since the anode off-gas contains the remaining hydrogen not used in the electrode reactions, the anode off-gas is mixed with the cathode off-gas and is discharged to the outside of the fuel cell system 100 to maintain a hydrogen concentration in the discharged gas at a predetermined concentration or lower.

The purge valve 36 is provided in the anode gas discharge passage 35. The open/close operation of the purge valve 36 is controlled by the controller 4 to control a flow rate of the anode off-gas (hereinafter, referred to as a "purge flow rate") discharged from the inside of the anode system to the cathode gas discharge passage 22.

The controller 4 is a microcomputer comprising a central processing unit (CPU), a read-only memory (ROM), a random access memory (RAM), and an input/output interface (I/O interface).

The controller 4 receives signals from various sensors for detecting an operation state of the fuel cell system 100, such as an accelerator stroke sensor 41 for detecting a depression level of an accelerator pedal (hereinafter, referred to as an "accelerator manipulation amount"), a temperature sensor 42 for detecting a temperature of the coolant (hereinafter, referred to as a "stack temperature") for cooling the fuel cell stack 1, and a current sensor 43 for detecting an output current of the fuel cell stack 1 in addition to the air flow sensor 24 described above.

The controller 4 computes a target output current of the fuel cell stack 1 based on an operation state of the fuel cell system 100. Specifically, the controller 4 computes the target output current of the fuel cell stack 1 based on a request of power from a driving motor (not illustrated) for driving a vehicle, requests of power from accessories such as cathode compressor 25, and a charge/discharge request from a battery (not illustrated).

The controller 4 performs pulsating operation for increasing/decreasing the anode pressure periodically based on an operation state of the fuel cell system 100. In the pulsating operation, basically, the anode pressure is pulsated by periodically increasing or decreasing the anode pressure within a range of the pulsation upper limit pressure and the pulsation lower limit pressure set depending on the target output current of the fuel cell stack 1. By performing this pulsating operation, it is possible to obtain water drainability by discharging liquid water inside the anode system to the outside of the anode system when the anode pressure increases.

Here, during electricity generation of the fuel cell stack 1, nitrogen or water vapor is transmitted from the cathode side to the anode side through the electrolytic membrane. For this reason, if the purge valve 36 remains in a closed state, hydrogen is consumed in the fuel cell stack 1, and the transmitted nitrogen and the like are accumulated in the anode system. As a result, even when a pressure inside the anode system (anode pressure) is controlled to the same pressure, the hydrogen concentration inside the anode system gradually decreases as much as the transmitted nitrogen and the like. In this manner, if electricity is generated while the hydrogen concentration inside the anode system decreases, hydrogen necessary to generate electricity inside the fuel cell stack 1 becomes short, and a voltage drop may occur even when the anode pressure is controlled to a target value.

Meanwhile, when the purge valve 36 is opened, nitrogen and the like accumulated in the anode system are discharged from the inside of the anode system as an anode off-gas. Therefore, the hydrogen concentration inside the anode system increases (is recovered). That is, the hydrogen concentration inside the anode system changes depending on the amount of the anode off-gas (hereinafter, referred to as a "purging amount") discharged from the inside of the anode system through the purge valve 36. Specifically, as the purging amount increases, the hydrogen concentration inside the anode system increases.

In this regard, according to this embodiment, a threshold value of the purge flow rate (or the purging amount) is obtained in advance through experiments or the like, at which the hydrogen concentration inside the anode system does not generate a voltage drop (target hydrogen concentration: for example, 60%) depending on a load of the fuel cell stack 1. In addition, a purge flow rate in the purge valve 36 open state is estimated, and the estimated purge flow rate is compared with the threshold value. If the estimated purge flow rate is equal to or lower than the threshold value, it is determined that the purging amount necessary to manage the hydrogen concentration inside the anode system at the target hydrogen concentration is short, and an additional purging operation is performed.

Here, as a method of estimating the purging amount, for example, it is conceived that a gas amount flowing out from the anode system during a purge valve 36 open duration is estimated based on the anode pressure decrease amount during the purge valve open duration in the hydrogen supply valve 33 close state, and a value obtained by subtracting the hydrogen amount consumed for generating electricity during the purge valve open duration from this gas amount is estimated as the amount of the anode off-gas discharged from the anode system through the purge valve 36, that is, the purging amount. It is noted that, if this purging amount is divided by this duration, the purge flow rate is obtained.

However, the gas flowing out from the anode system in the hydrogen supply valve 33 close state contains components other than the gas flowing out through the purge valve 36 (purge gas) or the hydrogen consumed by generating electricity. For example, the hydrogen transmitted from the anode side to the cathode side through the electrolytic membrane (hereinafter, referred to as a "transmitted hydrogen") or the water vapor which is liquid water condensed in the anode system are included. The transmitted hydrogen contributes to a decrease of the hydrogen concentration in the anode system. In addition, since hydrogen has a small molecular weight, the amount of hydrogen transmitting through the electrolytic membrane is not negligible.

In this manner, while the purge gas contributes to an increase of the hydrogen concentration in the anode system, the transmitted hydrogen contributes to a decrease of the hydrogen concentration in the anode system.

Therefore, typically, if a ratio of the transmitted hydrogen amount increases out of the purge amount estimated according to the estimation method described above, the hydrogen concentration in the anode system is recovered as the purge amount increases; however, the recovery amount is reduced. Therefore, if the transmitted hydrogen amount is neglected and is included in the purge amount, the actual hydrogen concentration in the anode system is lowered than the assumed value even when the purge flow rate is equal to or higher than the threshold value. This may generate an unanticipated voltage drop.

In this regard, according to this embodiment, only the gas flowing out through the purge valve 36 (purge gas) is computed as the purge amount. Hereinafter, a purge amount computation method according to this embodiment will be described with reference to FIGS. 2 and 3.

Figure 2:
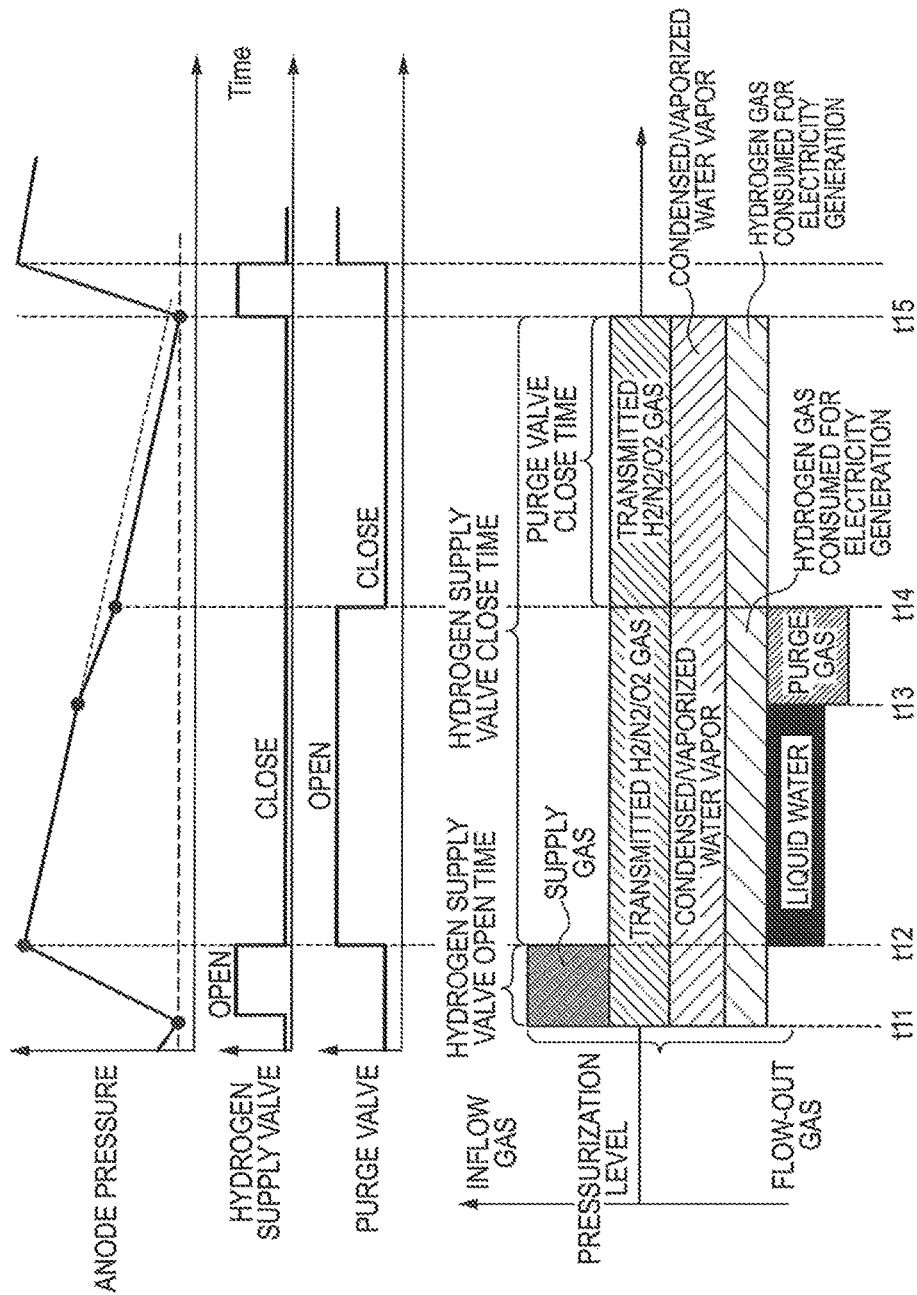
FIG. 2 is a diagram illustrating a method of estimating a purging amount according to a first embodiment of this invention.
Figure 3:
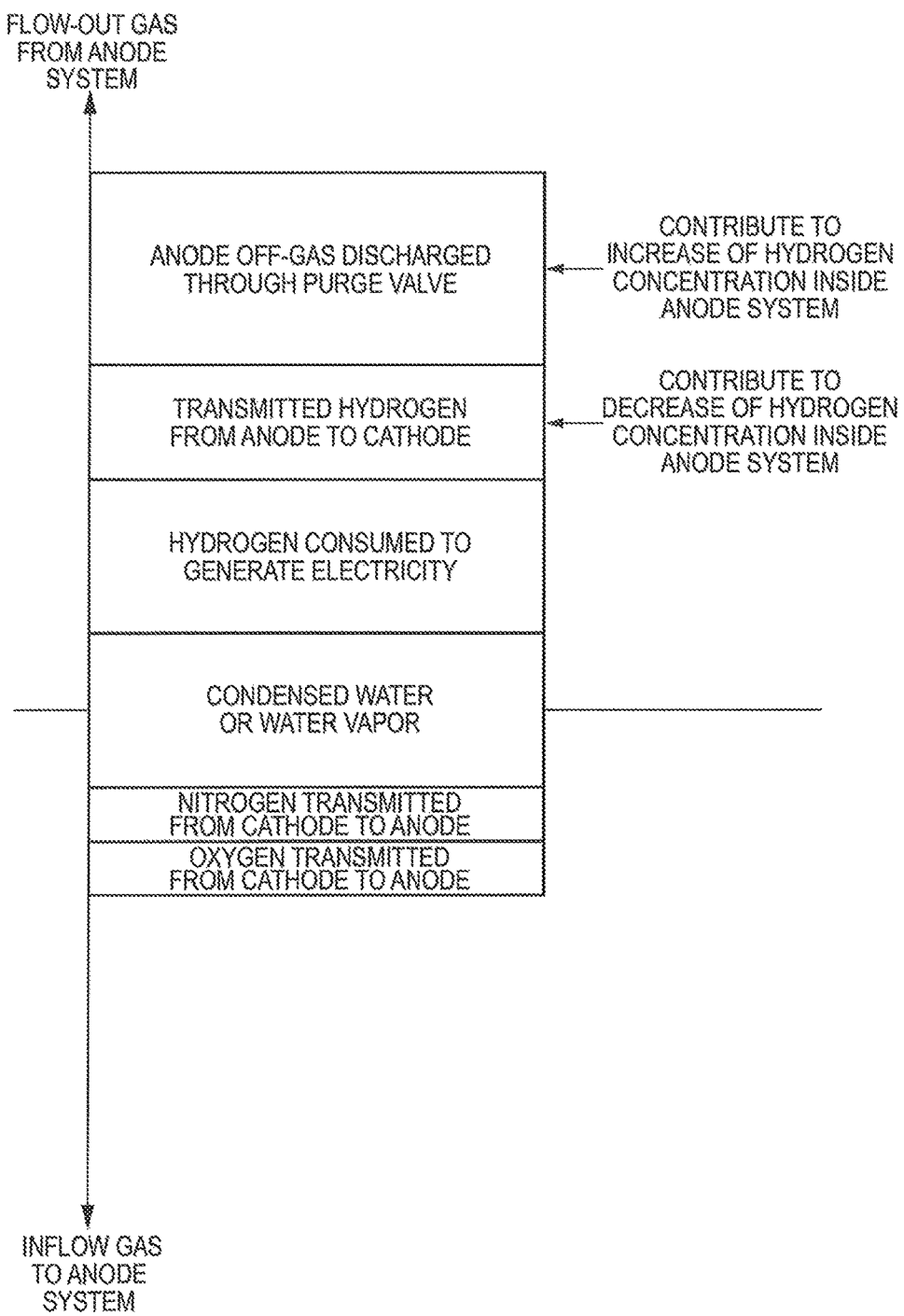
FIG. 3 is a diagram illustrating a gas input/output flow in the anode system in a hydrogen supply valve close state.

FIG. 2 is a diagram illustrating a purge amount computation method according to this embodiment. FIG. 3 is a diagram illustrating a gas input/output flow in the anode system in the hydrogen supply valve 33 close state.

According to this embodiment, only the gas (purge gas) flowing out through the purge valve 36 is computed as a purging amount based on a pressure decrease during the purge valve 36 close duration in the hydrogen supply valve 33 open state and a pressure decrease during the purge valve 36 close duration in the hydrogen supply valve 33 close state.

As illustrated in FIG. 2, while the hydrogen supply valve 33 is opened, and the purge valve 36 is closed from the timing t11 to the timing t12, the anode gas is accumulated in the anode system by supplying the anode gas to the anode system, so that the anode pressure increases. In addition, as the gas accumulated in the anode system in the hydrogen supply valve close state flows out from the inside the anode system in the hydrogen supply valve close state from the timing t12 to the timing t15, the anode pressure decreases. A change of the anode pressure in the hydrogen supply valve close state is generated from the following factors.

Referring to FIG. 2, the purge valve 36 is opened from the timing t12 to the timing t14, and is closed from the timing t14 to the timing t15. A description will be made for factors of changing the anode pressure regardless of the open/close state of the purge valve 36.

First, as illustrated in FIG. 2 and FIG. 3, a first factor is hydrogen inside the anode system consumed by generating electricity in the hydrogen supply valve 33 close state. This hydrogen consumed for generating electricity lowers the anode pressure. A second factor is a fact that liquid water inside the anode system is vaporized and changes to water vapor, or reversely, water vapor is condensed and changes to liquid water. The anode pressure changes depending on the balance between the vaporization and condensation. A third factor is hydrogen (transmitted hydrogen) transmitted from the anode side to the cathode side through the electrolytic membrane, or reversely, nitrogen and oxygen transmitted from the cathode side to the anode side through the electrolytic membrane. The anode pressure changes depending on the balance of these transmitted gases.

Since the purge valve 36 is closed from the timing t14 to the timing t15, the anode pressure decreases due to the three factors.

Meanwhile, since the purge valve 36 is opened from the timing t12 to the timing t14, the anode pressure decreases due to the gas (purge gas) flowing out through the purge valve 36 in addition to the three factors. It is noted that, due to the structure of the purge valve 36, as the purge valve 36 is opened, first, liquid water is discharged, and the anode off-gas is then discharged as the purge gas. Therefore, as illustrated in FIG. 2, the anode off-gas is discharged from the timing t13.

In this regard, according to this embodiment, the gas amount inside the anode system lost by the three factors is obtained based on a pressure decrease during the purge valve close duration (timing t14 to t15) in which the purge valve 36 is closed in the hydrogen supply valve 33 close state. That is, the gas amount discharged from the anode system regardless of the open/close state of the purge valve 36 is obtained. By dividing this gas amount by the purge valve close duration, it is possible to compute the gas amount inside the anode system per unit time lost by the three factors.

Here, even for the purge valve open duration from the timing t12 to the timing t14, it is conceived that, basically, the gas amount inside the anode system per unit time removed by the aforementioned three factors is not different from that of the purge valve close duration.

Therefore, the gas amount inside the anode system removed by the aforementioned three factors in the hydrogen supply valve close state (timing t12 to t15) can be computed by multiplying the gas amount inside the anode system per unit time removed by the aforementioned three factors by the hydrogen supply valve close time (purge valve open time+purge valve close time).

In addition, the gas amount flowing out from the inside of the anode system in the hydrogen supply valve close state is the gas amount inside the anode system removed by the aforementioned three factors during the hydrogen supply valve close duration (gas amount flowing out from the inside of the anode system regardless of the open/close state of the purge valve 36 in the hydrogen supply valve close state), and the gas amount flowing out through the purge valve 36 (that is, the purging amount).

Since the anode pressure at the timing t11 is equal to the anode pressure at the timing t15, the gas amount flowing out from the inside of the anode system in the hydrogen supply valve close state (timing t12 to t15) is equal to the gas amount accumulated in the anode system while the hydrogen supply valve 33 is opened, and the purge valve 36 is closed (timing t11 to t12)

Therefore, it is possible to compute only the gas amount flowing out through the purge valve 36 with high accuracy by subtracting the gas amount flowing out from the inside of the anode system regardless of the open/close state of the purge valve 36 in the hydrogen supply valve close state from the gas amount accumulated in the anode system in the hydrogen supply valve 33 open state and the purge valve 36 close state. If the gas amount flowing out through the purge valve 36 is divided by the purge valve open time, the purge flow rate is obtained.

Hereinafter, a purge control operation according to this embodiment will be described with reference to FIGS. 4 to 13.

Figure 4:
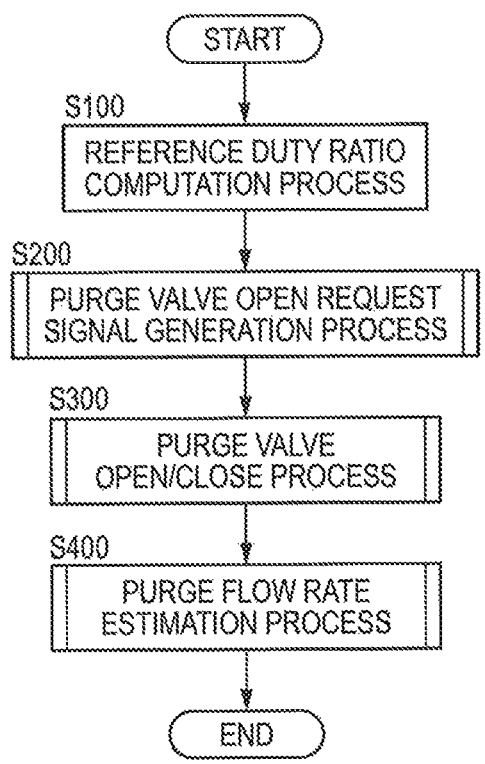
FIG. 4 is a flowchart illustrating a purge control operation according to the first embodiment of this invention.

FIG. 4 is a flowchart illustrating a purge control operation according to this embodiment. The controller 4 executes this routine repeatedly at a predetermined operation cycle.

Figure 5:
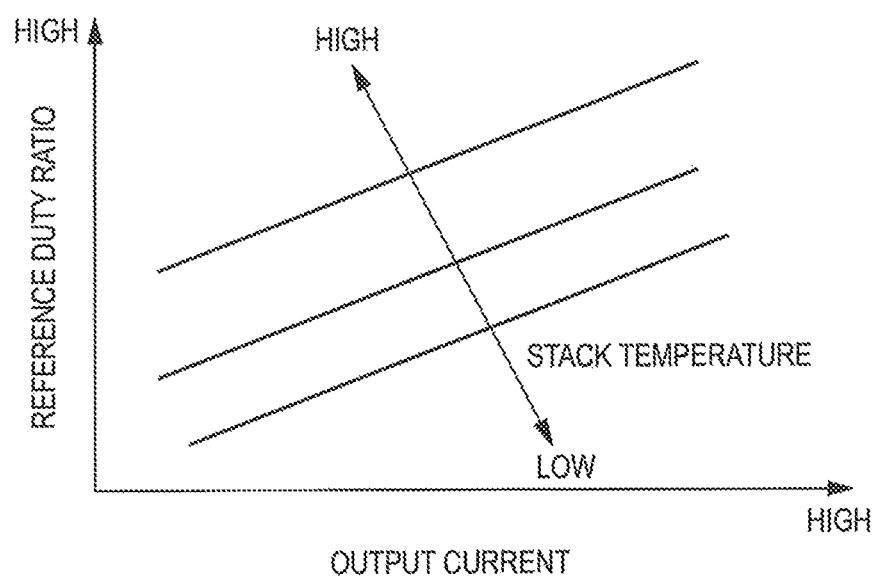
FIG. 5 is a map for computing a reference duty ratio based on a load of a fuel cell stack and a stack temperature.

In the step S100, the controller 4 computes a reference duty ratio based on a load (output current) of the fuel cell stack 1 and a stack temperature by referencing the map of FIG. 5. The reference duty ratio is a duty ratio of the purge valve 36 obtained in advance through experiments and the like, at which electricity can be stably generated from each load by fixing the purging period to a certain value (reference purging period: set to 5 seconds in this embodiment, but may be changed appropriately). In other words, the reference duty ratio is a duty ratio of the purge valve 36 at which the hydrogen concentration inside the anode system can be managed to the target hydrogen concentration. It is noted that the reference duty ratio may be computed based on only the load (output current) of the fuel cell stack 1.

In the step S200, the controller 4 performs a process of generating a valve open request signal of the purge valve 36 based on the reference duty ratio. The purge valve open request signal generation process will be described below in detail with reference to FIG. 6.

In the step S300, the controller 4 performs a process of opening/closing the purge valve 36 in practice in the hydrogen supply valve 33 close state (while the anode gas supply stops) based on the purge valve open request signal and the like. This purge valve 36 open/close process will be described below in detail with reference to FIG. 7.

In the step S400, the controller 4 performs a purge flow rate estimation process based on a pressure decrease of the purge valve 36 close duration in the hydrogen supply valve 33 open state and a pressure decrease of the purge valve 36 close duration in the hydrogen supply valve 33 close state. The purge flow rate estimation process will be described below in detail with reference to FIG. 8.

Figure 6:
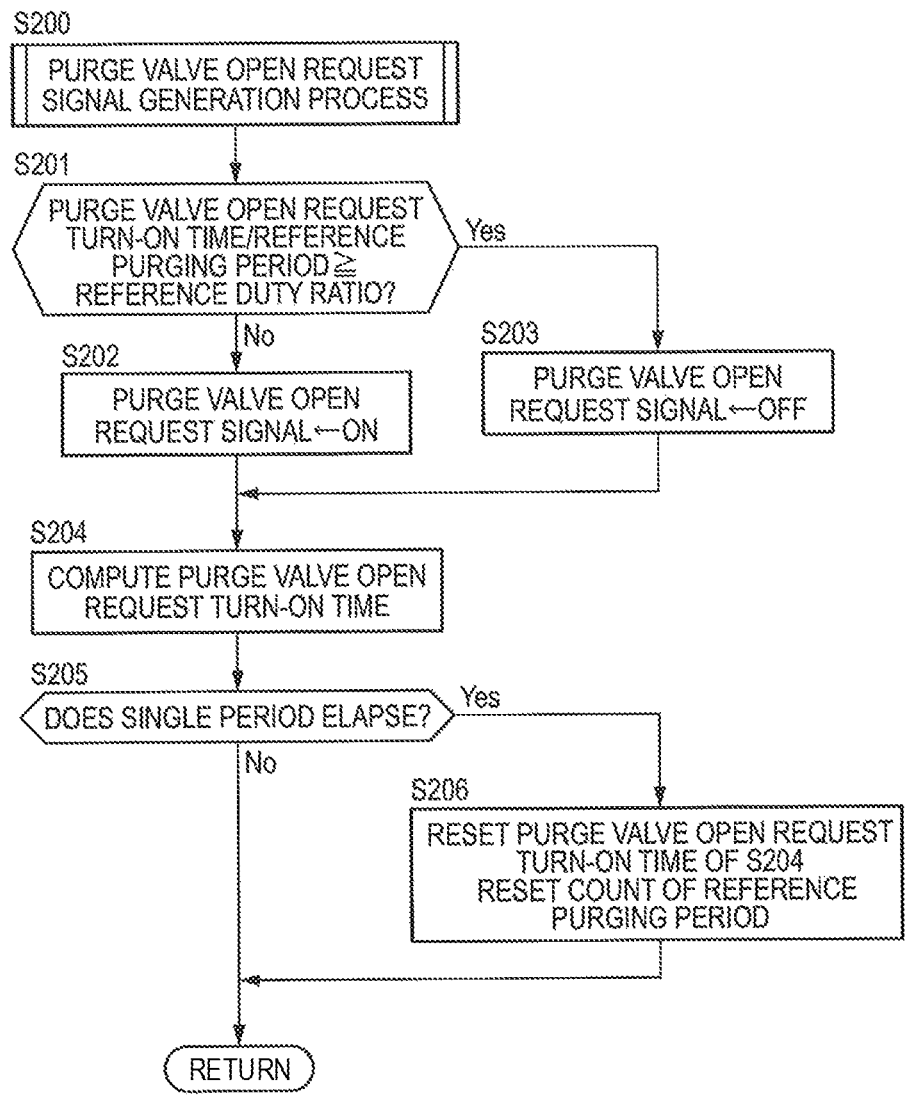
FIG. 6 is a flowchart illustrating a purge valve open request signal generation process in detail.

FIG. 6 is a flowchart illustrating a purge valve open request signal generation process in detail.

In the step S201, the controller 4 determines whether or not a value obtained by dividing an integrated time for which the purge valve open request signal described below is turned on (hereinafter, referred to as a "purge valve open request turn-on time") by a predetermined reference purging period is equal to or greater than the reference duty ratio. That is, the controller 4 determines whether or not a proportion of the purge valve open request turn-on time occupied in the reference purging period is equal to or greater than the reference duty ratio. The controller 4 performs the process of the step S202 if the division result is smaller than the reference duty ratio. If the division result is equal to or greater than the reference duty ratio, the controller 4 performs the process of the step S203.

In the step S202, the controller 4 turns on the purge valve open request signal.

In the step S203, the controller 4 turns off the purge valve open request signal.

In the step S204, the controller 4 computes the purge valve open request turn-on time by integrating the time for which the purge valve open request signal is turned on.

In the step S205, the controller 4 determines whether or not a single reference purging period elapses. That is, for example, when the reference purging period is set to 5 seconds, it is determined whether or not 5 seconds elapses after the count of the reference purging period starts. If it is determined that a single reference purging period does not elapse, the controller 4 terminates this process. If it is determined that a single reference purging period elapses, the controller 4 processes the step S206.

In the step S206, the controller 4 resets the purge valve open request turn-on time computed in the step S204 to zero, and also resets the count of the reference purging period to zero.

Figure 7:
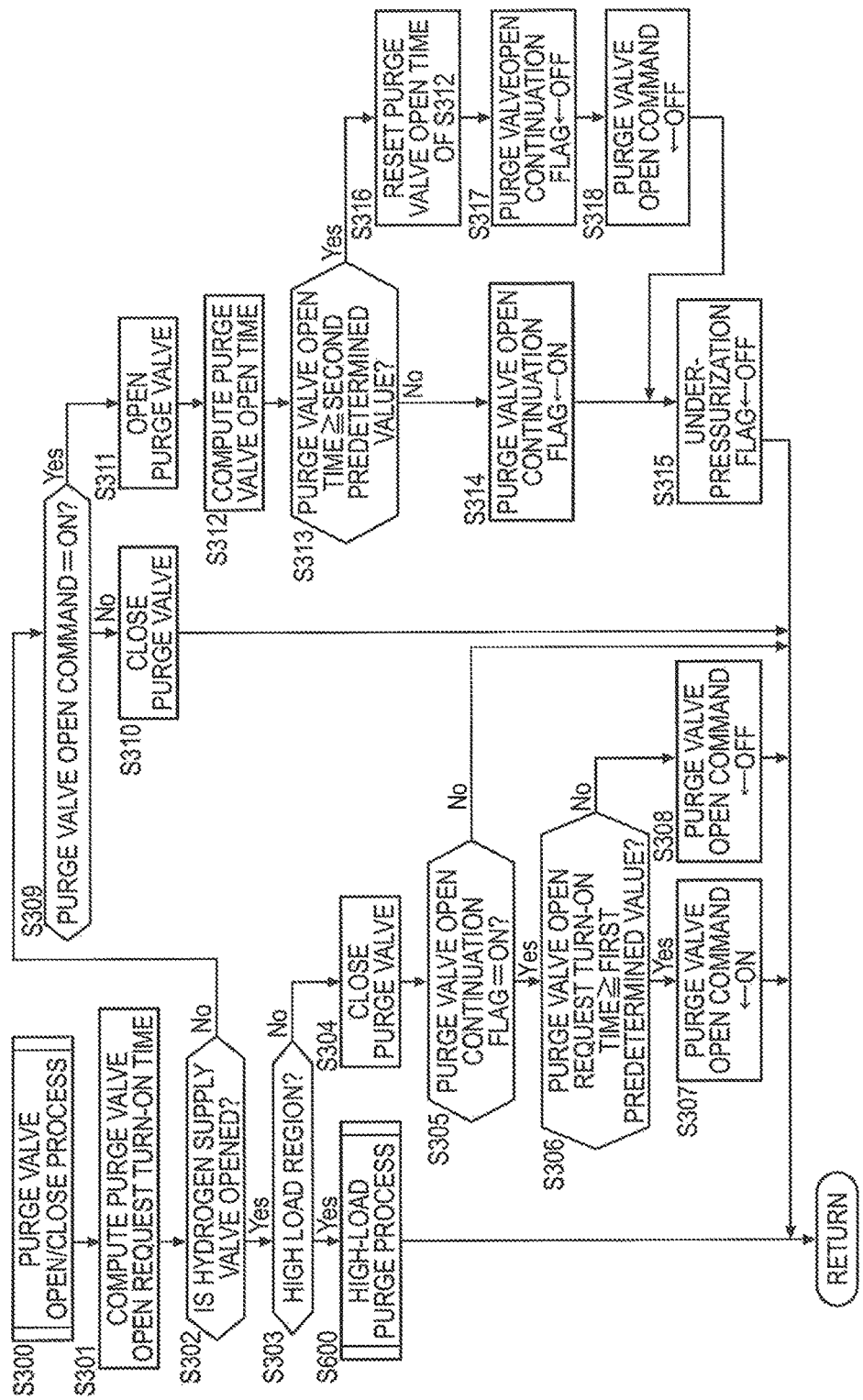
FIG. 7 is a flowchart illustrating a purge valve open/close process in detail.

FIG. 7 is a flowchart illustrating the purge valve open/close process in details.

In the step S301, the controller 4 computes the purge valve open request turn-on time separately from the step S204 described above.

In the step S302, the controller 4 determines whether or not the hydrogen supply valve 33 is opened. The controller 4 processes the step S302 when the hydrogen supply valve 33 is opened, that is, while the anode gas is supplied. Otherwise, when the hydrogen supply valve 33 is closed, that is, while the anode gas supply stops, the controller 4 processes the step S309. According to this embodiment, basically, the determination of the step S302 is performed in order to open the purge valve 36 when the hydrogen supply valve 33 is closed.

In step S303, the controller 4 determines whether or not the operation region of the fuel cell stack 1 is in a high load region. The controller 4 determines that the operation region is in the high load region, for example, when the output current is larger than a current of 20 A. The controller 4 processes the step S600 if the operation region of the fuel cell stack 1 is in the high load region. Otherwise, the controller 4 processes the step S304.

In the step S600, the controller 4 performs a purge valve 36 open/close process in the high load region. This high-load purging process will be described below in detail with reference to FIG. 13. In summary, the liquid water accumulated in the anode system in the high load region increases, compared to a typical region. Due to the structure of the purge valve 36, as the purge valve 36 is opened, first, the liquid water is discharged from the inside of the anode system, and the anode off-gas is then discharged. For this reason, in the high load region, the purge valve 36 can be opened even during the pulsated pressurization, so that the liquid water inside the anode system is reliably discharged from the inside of the anode system, and the anode off-gas is then appropriately discharged from the inside of the anode system.

In the step S304, the controller 4 closes the purge valve 36.

In the step S305, the controller 4 determines whether or not a purge valve open continuation flag is asserted. If the purge valve open continuation flag is asserted, the controller 4 processes the step S306. If the purge valve open continuation flag is not asserted, the controller 4 terminates this process.

The purge valve open continuation flag is a flag asserted until the purge valve open time while the anode gas supply stops exceeds a second predetermined value set in advance as a time for opening the purge valve 36 in practice when the anode gas supply stops. This purge valve open continuation flag is a flag set to continuously maintain the current purge valve open time without a change, for example, when the purge valve 36 is opened while the anode gas supply stops, and the anode gas supply starts before the second predetermined value elapses. As a result, the purge valve 36 is opened only for the remaining time when the next anode gas supply stops (split purging).

In the step S306, the controller 4 determines whether or not the purge valve open request turn-on time computed in the step S301 is equal to or longer than the first predetermined value set in advance. The controller 4 processes the step S307 if the purge valve open request turn-on time is equal to or longer than the first predetermined value. If the purge valve open request turn-on time is shorter than the first predetermined value, the controller 4 processes the step S308.

In the step S307, the controller 4 turns on the purge valve open command. The initial value of the purge valve open command is set to OFF. If the anode gas supply stop time elapses while the purge valve open command is turned on, the purge valve 36 is opened in practice. As a result, it is possible to open the purge valve 36 in synchronization with the close operation of the hydrogen supply valve 33.

In this manner, according to this embodiment, after the purge valve open request turn-on time (=integration value of the reference duty ratio) becomes equal to or longer than the first predetermined value, the purge valve open command is turned on, and the purge valve open operation is allowed. In this embodiment, this enables the anode off-gas to be reliably discharged through the purge valve 36 in the purge valve open state by guaranteeing a certain time for opening the purge valve 36 to reliably perform water drainage in the hydrogen supply valve 33 close state.

In this manner, the reference duty ratio decreases as the output current decreases. Therefore, it is possible to increase the time elapsing until the purge valve open command is turned on as the output current decreases. That is, by changing the interval for outputting the purge valve open command based on the output current, an interval (purging interval) until the purge valve is opened after it is closed increases as the output current decreases. When the output current is low, the cathode pressure is also low, so that the amount of nitrogen and the like transmitting from the cathode side are also small. Therefore, even when the purging interval increases accordingly, a decrease of the hydrogen concentration inside anode system is also small. For this reason, the anode off-gas is discharged together by increasing the purging interval as much as the output current decreases, so that the anode off-gas is reliably discharged through the purge valve 36 in the purge valve close state.

In the step S308, the controller 4 turns off the purge valve open command.

In the step S309, the controller 4 determines whether or not the purge valve open command is turned on. If the purge valve open command is turned off, the controller 4 processes the step S310. If the purge valve open command is turned on, the controller 4 processes the step S311.

In the step S310, the controller 4 closes the purge valve 36. In this manner, the purge valve 36 is not opened until the purge valve open request turn-on time is equal to or longer than the first predetermined value even when the anode gas supply stops.

In the step S311, the controller 4 opens the purge valve 36.

In the step S312, the controller 4 computes the purge valve open time by integrating the time for which the purge valve 36 is opened.

In the step S313, the controller 4 determines whether or not the purge valve open time computed in the step S312 is equal to or longer than a second predetermined value set in advance as a time for opening the purge valve 36 in practice when the anode gas supply stops. In this manner, according to this embodiment, if the purge valve open request turn-on time is equal to or longer than the first predetermined value, the purge valve 36 is opened only for the second predetermined value. Although the first and second predetermined values are set to the same value in this embodiment, they may be set to different values. The first and second predetermined values may be obtained in advance through experiments and the like as a value (for example, 0.5 second) at which the hydrogen concentration inside the anode system can be maintained at the target hydrogen concentration, and the purge flow rate can be estimated with high accuracy. The controller 4 processes the step S314 if the purge valve open time is shorter than the second predetermined value. If the purge valve open time is equal to or longer than the second predetermined value, the controller 4 processes the step S316.

In the step S314, the controller 4 asserts the purge valve open continuation flag. An initial value of the purge valve open continuation flag is set to "OFF."

In the step S315, the controller 4 de-asserts the pressurization flag. The pressurization flag is a flag used in the high-load purging process, and its initial value is set to "OFF."

In the step S316, the controller 4 resets the purge valve open time computed in the purge valve open/close process to zero.

In the step S317, the controller 4 de-asserts the purge valve open continuation flag.

In the step S318, the controller 4 turns off the purge valve open command.

Figure 8:
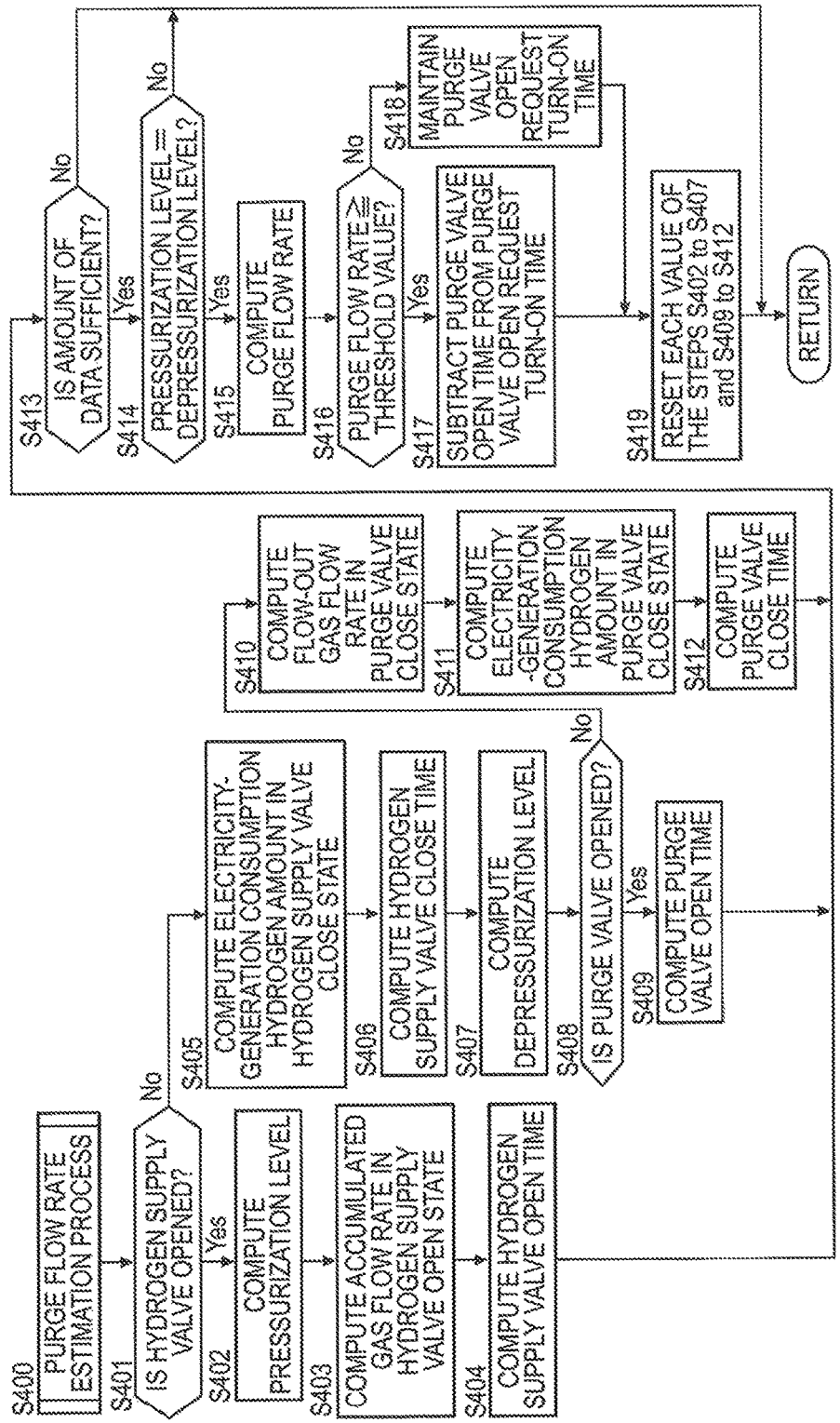
FIG. 8 is a flowchart illustrating a purge flow rate estimation process in detail.

FIG. 8 is a flowchart illustrating a purge flow rate estimation process in detail.

In the step S401, the controller 4 determines whether or not the hydrogen supply valve 33 is closed. If the hydrogen supply valve 33 is opened, the controller 4 processes step S402. Otherwise, if the hydrogen supply valve 33 is closed, the controller 4 processes the step S405.

In the step S402, the controller 4 computes a pressurization level of the anode pressure after the hydrogen supply valve 33 is opened. Specifically, the pressurization level is computed by integrating the pressurization level of the anode pressure per operation cycle.

Figure 9:
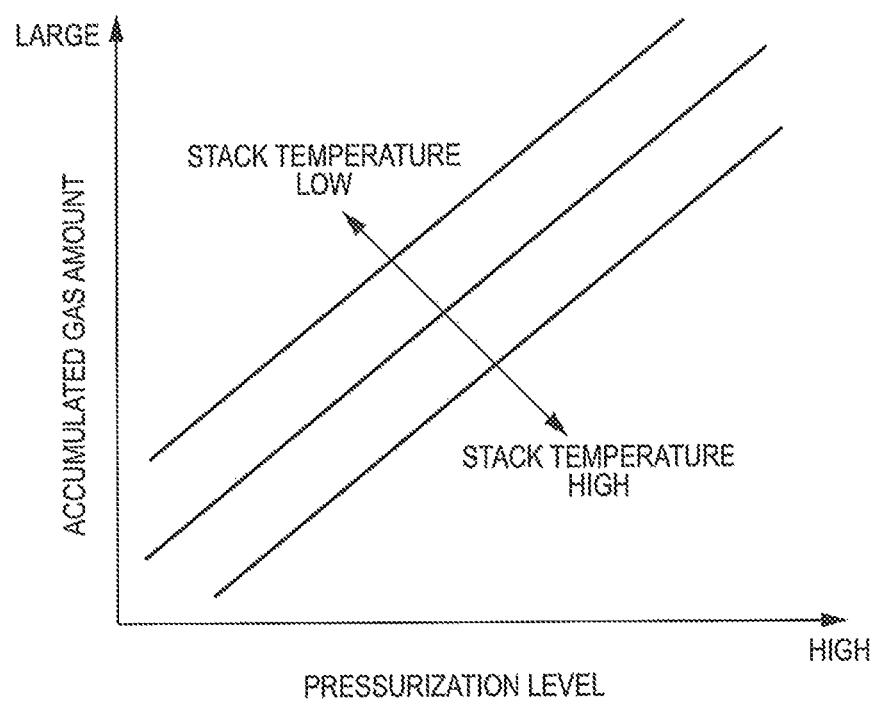
FIG. 9 is a map for computing a gas amount accumulated inside the anode system in a hydrogen supply valve open state based on a pressurization level.

In the step S403, the controller 4 computes the gas amount accumulated in the anode system in the hydrogen supply valve 33 open state based on the pressurization level of the anode pressure. This gas amount may be computed by creating the map of FIG. 9 and the like in advance through experiments and the like by associating the pressurization level of the anode pressure and the gas amount accumulated in the anode system and referencing this map. In FIG. 9, although the gas amount accumulated in the anode system is corrected based on the stack temperature, the correction using the stack temperature may not necessarily be performed. In addition, this gas amount may be obtained by computing a change of a molar amount of the gas inside the anode system obtained by applying the anode pressure before pressurization and the like to an equation of state of the gas and a change of a molar amount of the gas inside the anode system obtained by applying the anode pressure value before pressurization and the like to an equation of state of the gas.

In the step S404, the controller 4 computes the hydrogen supply valve open time by integrating the open time for the hydrogen supply valve 33.

In the step S405, the controller 4 computes the hydrogen amount per operation cycle consumed in the fuel cell stack 1 by generating electricity in the hydrogen supply valve close state based on the detection value (output current) of the electric current sensor 43 and integrates this hydrogen amount to compute the electricity-generation consumption hydrogen amount in the hydrogen supply valve close state.

Figure 10:
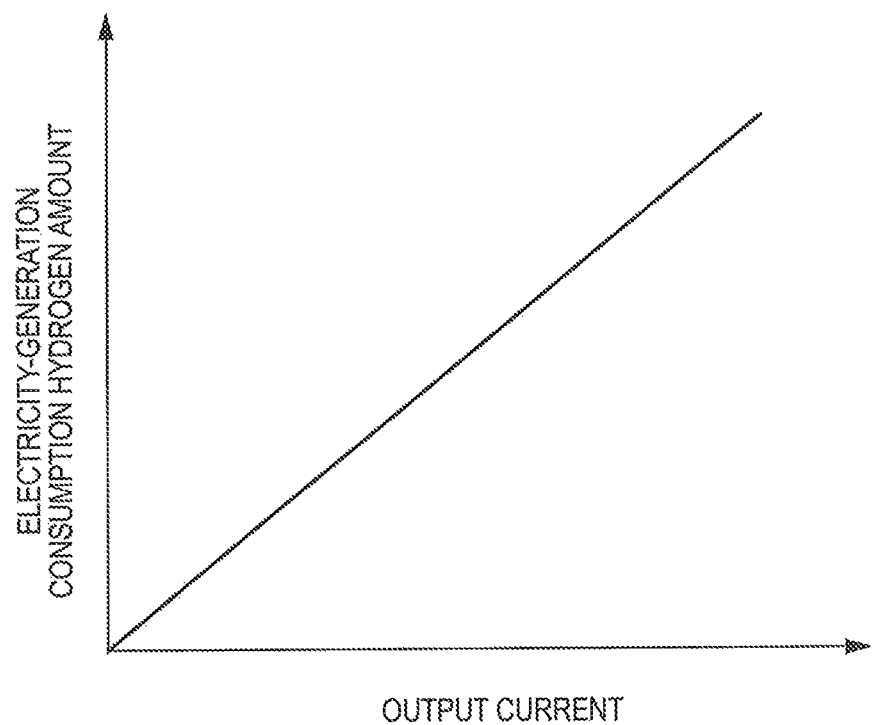
FIG. 10 is a map for computing a hydrogen amount per operation cycle consumed in the fuel cell stack 1 by generating electricity in a purge valve open state based on an output current.

This hydrogen amount per operation cycle consumed in the fuel cell stack 1 by generating electricity in the hydrogen supply valve open state may be computed, for example, based on the output current by creating, in advance, the table of FIG. 10 obtained by associating the output current and the consumed hydrogen amount through experiments and the like and referencing this table. For example, a molar mass of the consumed hydrogen may also be computed by applying the output current, operation cycle, and the number of fuel cells to a Faraday constant-based formula.

In the step S406, the controller 4 integrates the time for which the hydrogen supply valve 33 is closed to compute a hydrogen supply valve close time.

In the step S407, the controller 4 computes a decompression level of the anode pressure after the hydrogen supply valve 33 is closed. Specifically, the depression level of the anode pressure is computed by integrating the depression level of the anode pressure per operation cycle.

In the step S408, the controller 4 determines whether or not the purge valve 36 is opened. The controller 4 processes the step S409 when the purge valve 36 is opened. Otherwise, the controller 4 processes the step S410 when the purge valve 36 is closed.

In the step S409, the controller 4 integrates the time for which the purge valve 36 is opened to compute a purge valve open time.

In the step S410, the controller 4 computes a gas amount per operation cycle flowing out from the anode system in the purge valve close state based on a decrease of the anode pressure and adds the result to the previous one to compute a flow-out gas amount in the purge valve open state.

Figure 11:
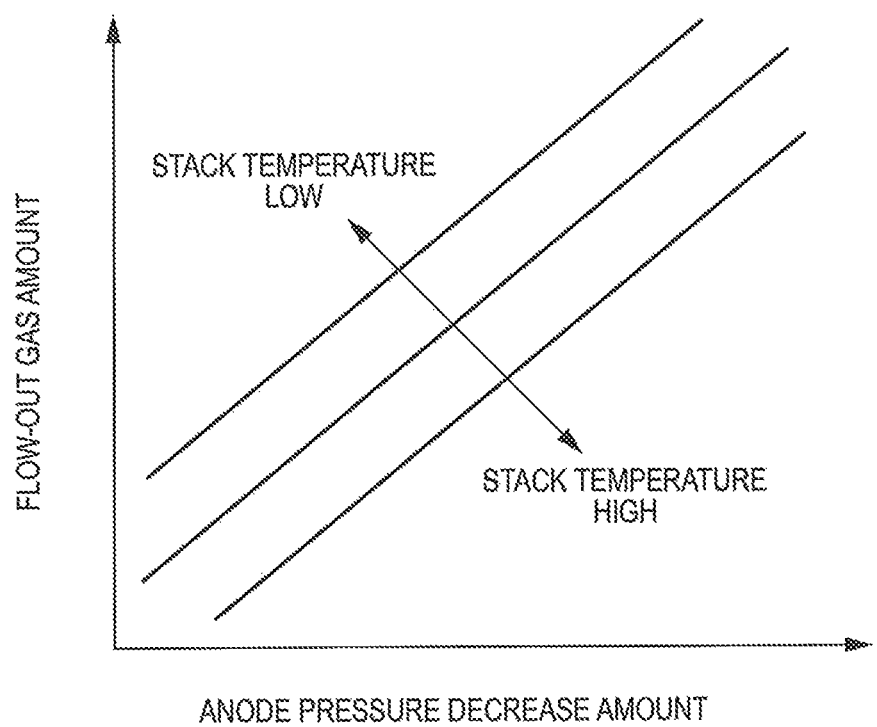
FIG. 11 is a map for computing a gas amount per operation cycle flowing out from the inside of the anode system in a purge valve open state based on a decrease amount of the anode pressure.

The gas amount per operation cycle flowing out from the anode system in the purge valve close state may be computed based on a decrease amount of the anode pressure by creating, for example, by creating the map of FIG. 11 and the like in advance through experiments and the like by associating the anode pressure decrease amount (previous anode pressure value–current anode pressure value) and the gas amount flowing out from the inside of the anode system and referencing this map. In FIG. 11, although the gas amount flowing out from the inside of the anode system is corrected based on the stack temperature, the correction using the stack temperature may not necessarily be performed. In addition, this gas amount may be obtained by computing changes of a molar amount of the gas inside the anode system obtained by applying the previous anode pressure value and the like to an equation of state of the gas and a molar amount of the gas inside the anode system obtained by applying the current anode pressure value and the like to an equation of state of the gas.

In the step S411, the controller 4 computes a hydrogen amount per operation cycle consumed in the fuel cell stack 1 by generating electricity in the purge valve close state based on the detection value (output current) of the electric current sensor 43 and integrates the hydrogen amount to compute the electricity-generation consumption hydrogen amount in the hydrogen supply valve close state.

In the step S412, the controller 4 integrates the time for which the purge valve 36 is closed to compute a purge valve close time.

In the step S413, the controller 4 determines whether or not the amount of data for computing the purge flow rate is sufficient. Specifically, it is determined whether or not the hydrogen supply valve open time and the purge valve close time computed in the steps S404 and S412 are equal to or longer than a predetermined time (for example, 0.5 second) set in advance. If the amount of data is sufficient, the controller 4 processes the step S413. If the amount of data is not sufficient, the controller 4 terminates this process. Therefore, if the amount of data is not sufficient, the purge flow rate is estimated based on the pressure change data of a plurality of pulsation cycles as well as data of a single pulsation cycle.

In the step S414, the controller 4 determines whether or not the pressurization level and the depressurization level match. In this embodiment, this determination is performed in order to estimate the purge flow rate using a fact that the gas amount (gas amount corresponding to the pressurization level) accumulated in the anode system during the purge valve 36 close duration by opening the hydrogen supply valve 33 is equal to the gas amount (gas amount corresponding to the depressurization level) flowing out from the inside of the anode system during the purge valve 36 close duration by closing the hydrogen supply valve 33.

Figure 12A:
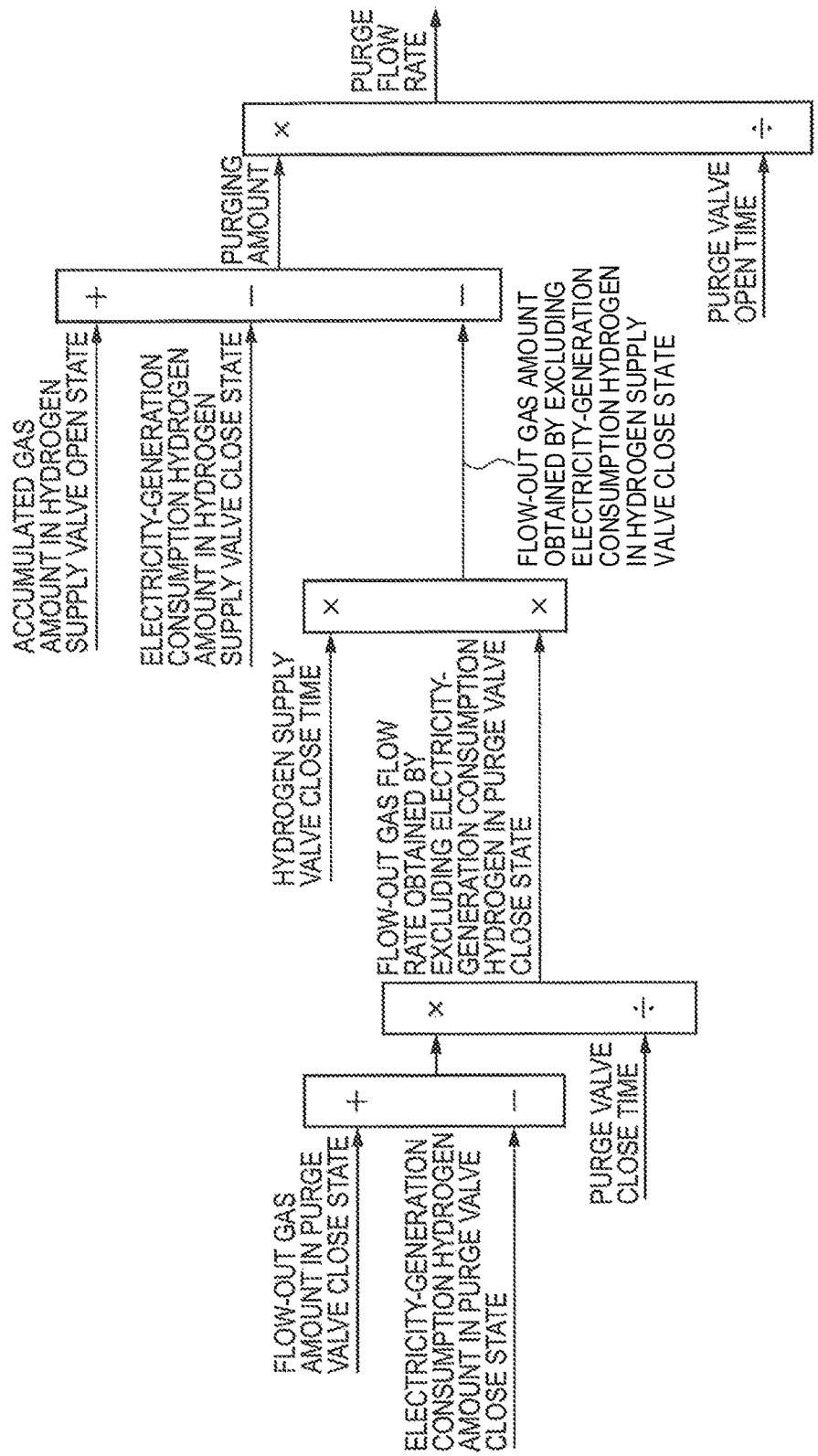
FIG. 12A is a diagram illustrating a purge flow rate computation method according to a first embodiment of this invention.
Figure 12B:
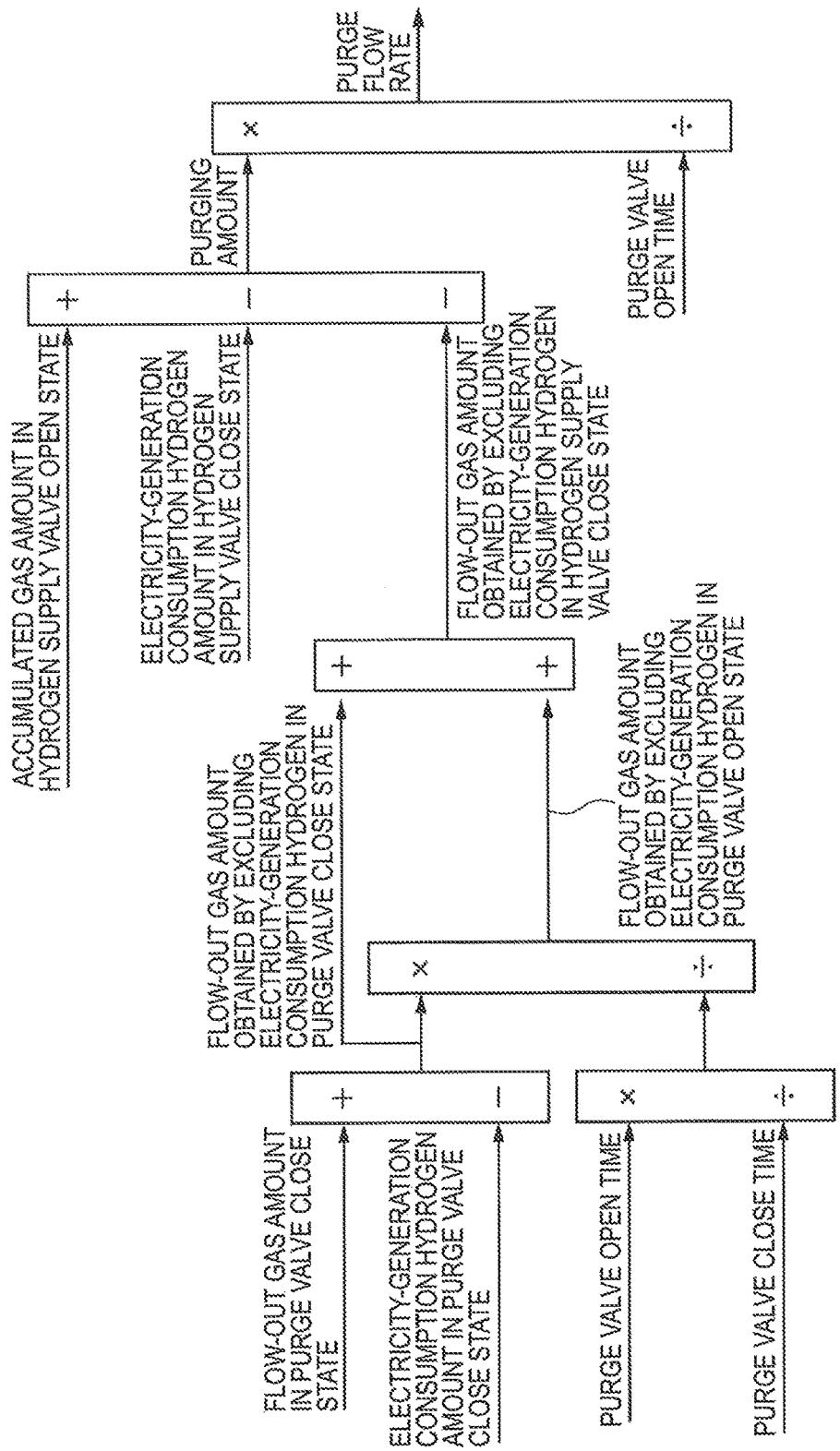
FIG. 12B is a diagram illustrating a purge flow rate computation method according to a modification of this invention.

In the step S415, the controller 4 computes the purge flow rate based on the data obtained in the steps S402 to S407 and S408 to S412. Specifically, the controller 4 computes the purge flow rate by performing the computation of FIG. 12A. FIG. 12A illustrates a method of computing the purge flow rate described with reference to FIG. 2. It is noted that the gas amount flowing out from the anode system excluding the hydrogen amount consumed for generating electricity in the hydrogen supply valve close state may be computed based on the method of FIG. 12B without limiting to FIG. 12A.

Figure 13:
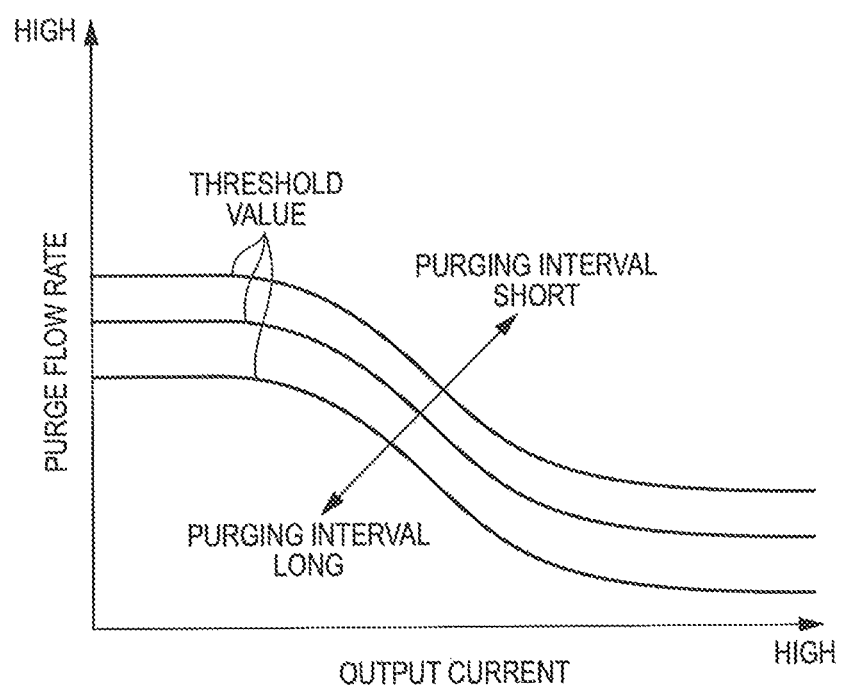
FIG. 13 is a diagram illustrating a threshold value of the purge flow rate.

In the step S416, the controller 4 determines whether or not the computed purge flow rate is equal to or greater than a predetermined threshold value by referencing the table of FIG. 13. In other words, it is determined whether or not the purging amount is sufficient. If the purge flow rate is equal to or greater than the threshold value, the controller 4 processes the step S417. If the purge flow rate is smaller than the threshold value, the controller 4 processes the step S418.

As illustrated in FIG. 13, the threshold value is corrected to decrease as an interval for outputting the purge valve open command (an interval after the purge valve open command is issued until the next purge valve open command is issued, hereinafter, referred to as a "purging interval") increases.

As the purging interval increases, the time period elapsing after the purge valve 36 is opened until the purge valve 36 is opened again increases. Therefore, the amount of liquid water accumulated in the anode system increases. For this reason, as the purging interval increases, the purging amount discharged in the purge valve 36 open state relatively decreases. According to this embodiment, the purge valve 36 is opened depending on an open/close state of the hydrogen supply valve 33. Therefore, the interval until the purge valve 36 is opened changes. In this case, the purging amount decreases when the purging interval is long compared to a case where the purging interval is short. This is because the amount of liquid water inside the anode system increases as the purging interval increases. Therefore, frequency of determination of purging shortage is reduced by decreasing the threshold value as the interval for issuing the purge valve open command increases.

It is noted that, in order to manage the hydrogen concentration inside the anode system for stably generating electricity, basically, it is necessary to increase the purging amount as the load of the fuel cell stack 1 increases. Referring FIG. 13, it may be conceived that this tendency is reversed because the threshold value decreases as the load of the fuel cell stack 1 increases. However, this is because the purge flow rate is expressed in the abscissa. The purging amount itself obtained by multiplying the purge valve 36 open time corresponding to the reference duty ratio for each load by the purge flow rate increases as the load of the fuel cell stack 1 increases.

In the step S417, the controller 4 subtracts the purge valve open time from the purge valve open request turn-on time computed in the step S301.

In the step S418, the controller 4 maintains the purge valve open request turn-on time computed in the step S301 as it is. This is to perform additional purging in the next process because it is necessary to further perform purging in order to stably generate electricity when it is determined that the purge flow rate is smaller than the threshold value.

In this manner, when the purge flow rate is smaller than the threshold value (when the purging amount is short), the purge valve open time is not subtracted from the purge valve open request turn-on time, so that the purge valve open request turn-on time increases, compared to a case where the purging interval is shorter than the typical value, and the purge flow rate is equal to or greater than the threshold value (when the purging amount is sufficient). As a result, the time for opening the purge valve 36 increases as much as the increase amount, that is, the subtraction cancellation amount.

In the step S419, the controller 4 resets the data obtained in the steps S402 to S407 and S409 to S412 to zero.

Figure 14:
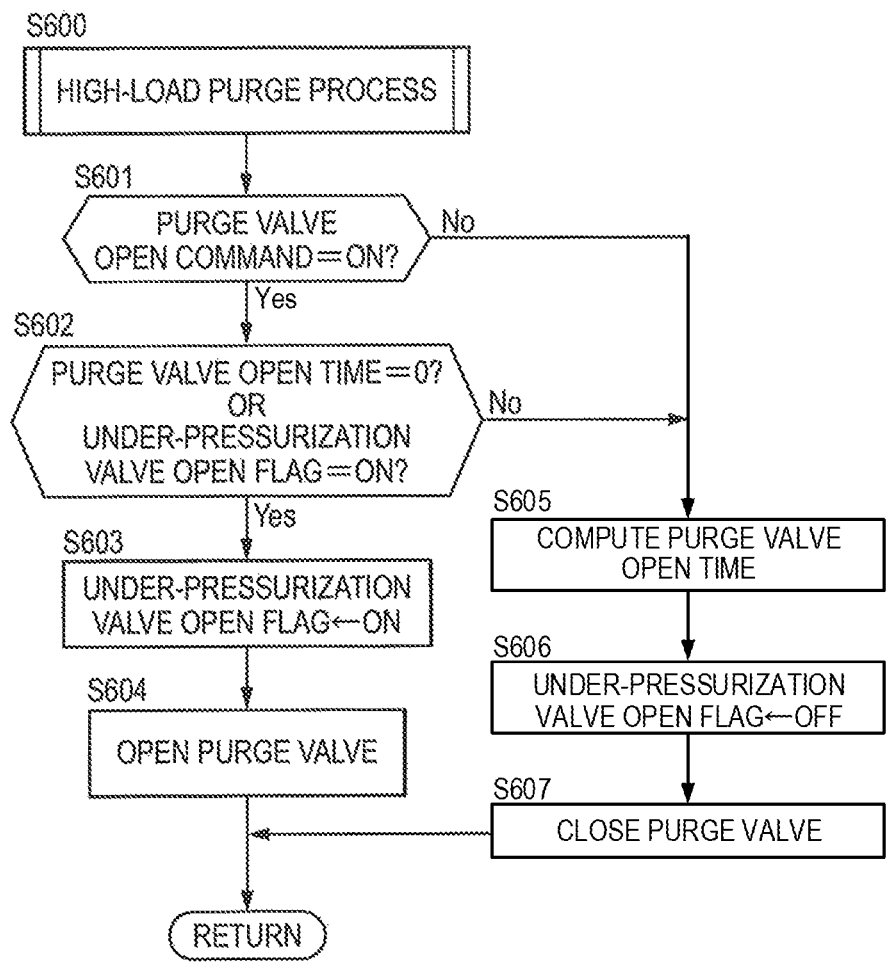
FIG. 14 is a flowchart illustrating a high-load purging process in detail.

FIG. 14 is a flowchart illustrating the high-load purge process in detail.

In the step S601, the controller 4 determines whether or not the purge valve open command is turned on. The controller 4 process the step S602 if the purge valve open command is turned on. If the purge valve open command is turned off, the controller 4 processes the step S605.

In the step S602, the controller 4 determines whether or not the purge valve open time computed in the step S312 is zero, or whether or not the under-pressurization valve open flag is asserted. If any one of the conditions is satisfied, the controller 4 processes the step S603. If both conditions are not satisfied, the controller 4 processes the step S605.

In the step S603, the controller 4 asserts the under-pressurization valve open flag.

In the step S604, the controller 4 opens the purge valve 36.

In the step S605, the controller 4 computes the purge valve open time by integrating the time for which the purge valve 36 is opened.

In the step S606, the controller 4 de-asserts the under-pressurization valve open flag.

In the step S607, the controller 4 closes the purge valve 36.

In this manner, in a high load condition, the purge valve 36 is opened even when the hydrogen supply valve 33 is opened. This is to reliably discharge the liquid water by opening the purge valve 36 from the opening of the hydrogen supply valve 33 because the liquid water inside the fuel cell stack 1 increases in the high load condition. In addition, in the high load condition, since the hydrogen amount consumed by generating electricity increase, an anode pressure decrease rate after closing the hydrogen supply valve 33 increases, and the depressurization time is also shortened. Therefore, if the liquid water discharge efficiency is improved by opening the purge valve 36 during the pressurization, it is possible to reliably discharge the purge gas through the purge valve 36 after the hydrogen supply valve is closed even when the depressurization time is shortened. For this reason, it is possible to improve estimation accuracy of the purge flow rate.

Figure 15:
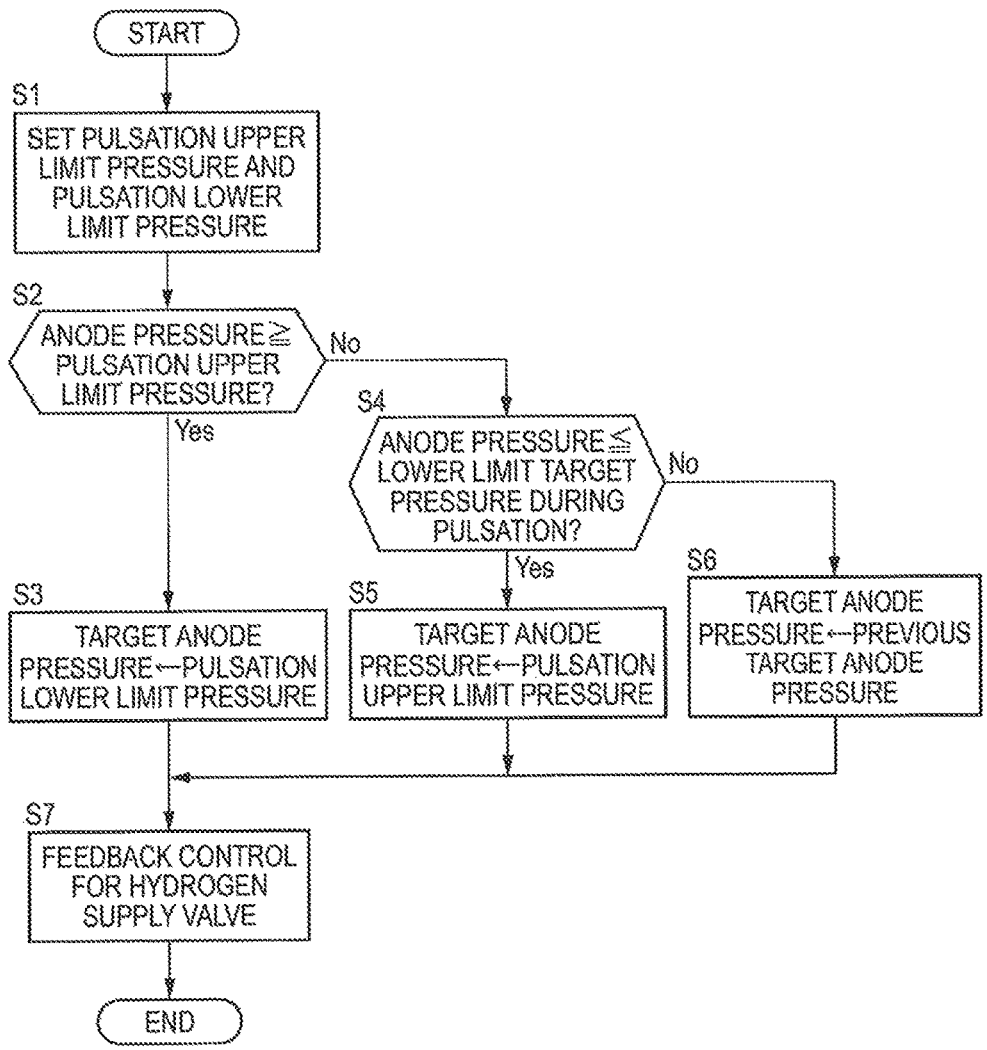
FIG. 15 is a flowchart illustrating a control of the hydrogen supply valve according to an embodiment of this invention.
Figure 16:
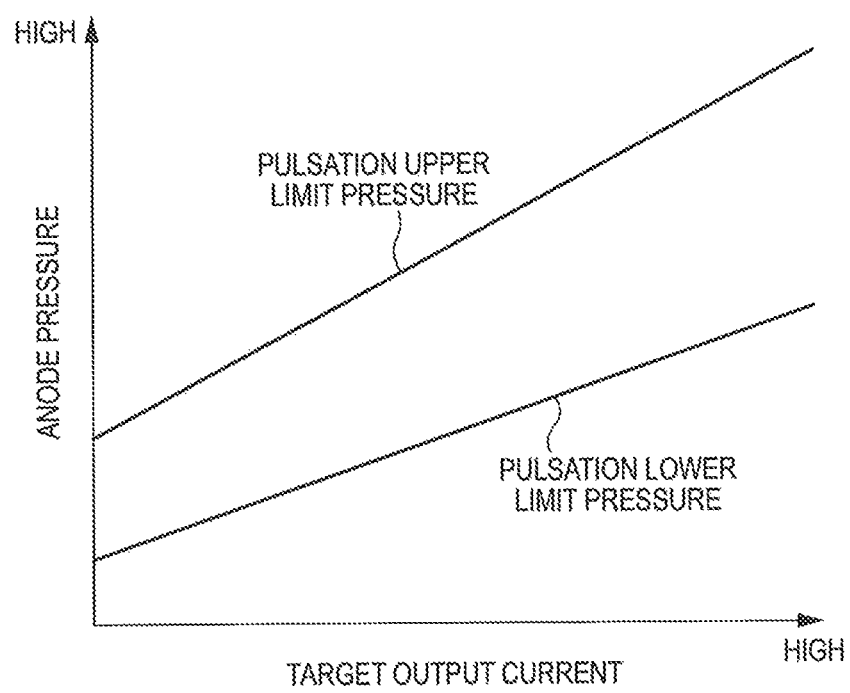
FIG. 16 is a table for computing pulsation upper/lower limit pressures based on a target output current.

FIG. 15 is a flowchart illustrating a control of the hydrogen supply valve 33 according to this embodiment.

In the step S1, the controller 4 sets the pulsation upper limit pressure and the pulsation lower limit pressure of the anode pressure based on a target output current of the fuel cell stack 1 with reference to the table of FIG. 14B.

In the step S2, the controller 4 determines whether or not the anode pressure is equal to or higher than the pulsation upper limit pressure. If the anode pressure is equal to or higher than the pulsation upper limit pressure, the controller 4 processes the step S3 in order to decrease the anode pressure. Otherwise, if the anode pressure is lower than the pulsation upper limit pressure, the controller 4 processes the step S4.

In the step S3, the controller 4 sets the target anode pressure to the pulsation lower limit pressure.

In the step S4, the controller 4 determines whether or not the anode pressure is equal to or lower than the pulsation lower limit pressure. If the anode pressure is equal to or lower than the pulsation lower limit pressure, the controller 4 processes the step S5 in order to increase the anode pressure. Otherwise, if the anode pressure is higher than the pulsation lower limit pressure, the controller 4 processes the step S6.

In the step S5, the controller 4 sets the target anode pressure to the pulsation upper limit pressure.

In the step S6, the controller 4 sets the target anode pressure to the previous target anode pressure.

In the step S7, when the pulsation lower limit pressure is set as the target anode pressure, the controller 4 performs a feedback control for the hydrogen supply valve 33 such that the anode pressure is set to the pulsation lower limit pressure. As a result of this feedback control, typically, the opening level of the hydrogen supply valve 33 is fully closed, so that the anode gas supply from the high-pressure hydrogen tank 31 to the fuel cell stack 1 stops. As a result, the anode pressure decreases due to consumption of the anode gas inside the fuel cell stack 1 for generating electricity or other reasons.

Meanwhile, when the pulsation upper limit pressure is set as the target anode pressure, the controller 4 performs a feedback control for the hydrogen supply valve 33 such that the anode pressure decreases to the pulsation upper limit pressure. As a result of this feedback control, the hydrogen supply valve 33 is opened to a desired opening level, and the anode gas is supplied from the high-pressure hydrogen tank 31 to the fuel cell stack 1, so that the anode pressure increases.

Figure 17:
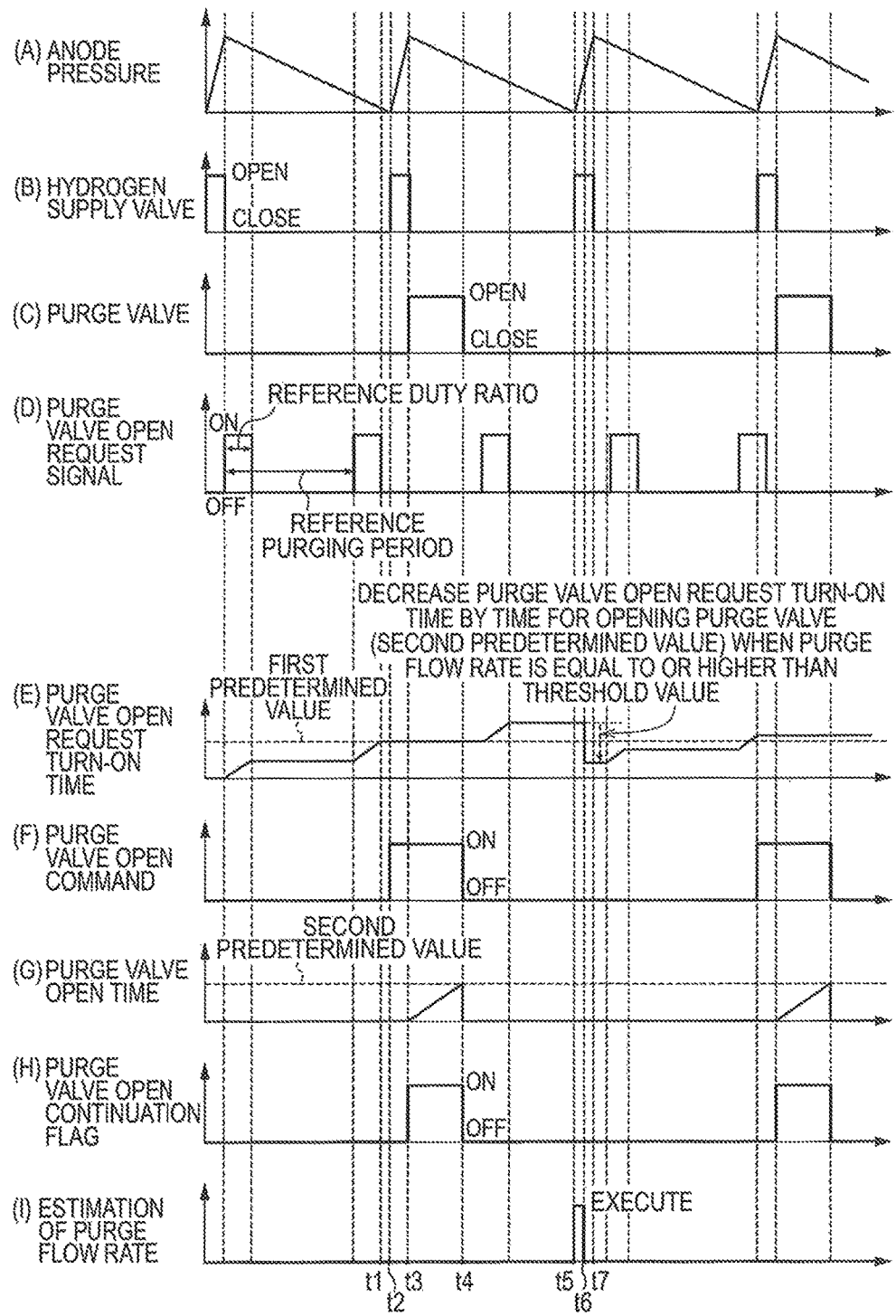
FIG. 17 is a timing chart of the purge control when the purge flow rate is equal to or higher than a threshold value in a normal operation region.
Figure 18:
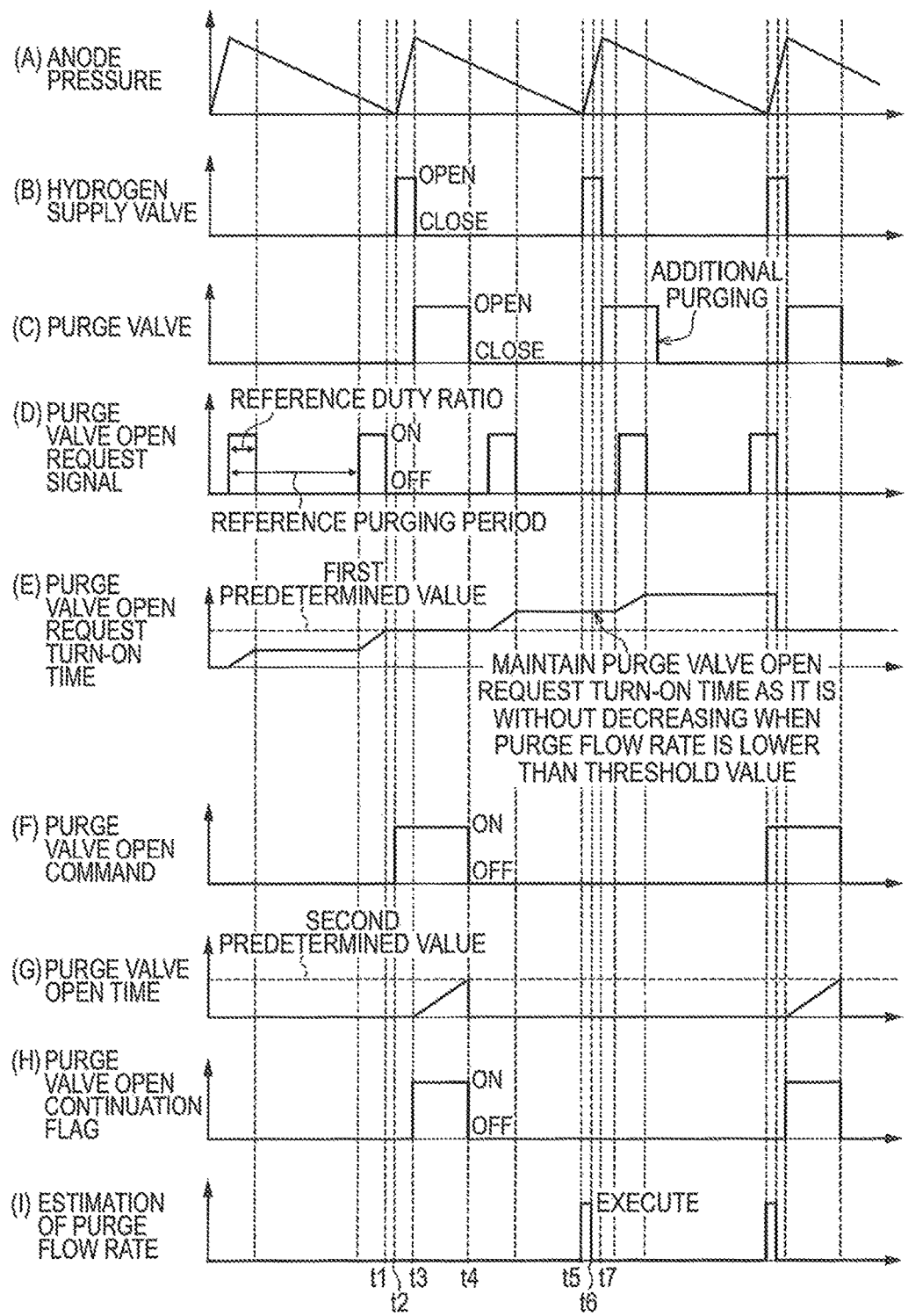
FIG. 18 is a timing chart of the purge control when the purge flow rate is lower than the threshold value in a normal operation region.

FIGS. 17 and 18 are timing charts illustrating a purge control according to this embodiment. FIG. 17 is a timing chart when the purge flow rate is equal to or higher than the threshold value in a normal operation region. Meanwhile, FIG. 18 is a timing chart when the purge flow rate is lower than the threshold value in a normal operation region.

As illustrated in FIG. 17D, through the purge valve open request signal generation process, the purge valve open request signal is generated such that the purge valve open request signal is turned on only for the reference duty ratio during the reference purging period. In addition, as illustrated in FIG. 17E, the purge valve open request turn-on time is computed by integrating the time for which the purge valve open request signal is turned on.

If the purge valve open request turn-on time is equal to or longer than the first predetermined value at the timing t1, the purge valve open command is turned on (FIG. 17F) when the hydrogen supply valve 33 is opened (FIG. 17B) at the timing t2 subsequent to the timing t1.

In addition, if the hydrogen supply valve 33 is closed while the purge valve open command is turned on at the timing t3, the purge valve 36 is opened (FIG. 17C). As the purge valve 36 is opened, the purge valve open time is computed by integrating the time for which the purge valve 36 is opened as illustrated in FIG. 17G. If the purge valve open time is equal to or longer than the second predetermined value at the timing t4, the purge valve open command is turned off (FIG. 17F), and the purge valve 36 is closed (FIG. 17C).

During the hydrogen supply valve open duration of the timing t2 to t3, the data for estimating the purge flow rate, that is, the gas amount accumulated in the anode system in the hydrogen supply valve open state is computed.

Then, during the hydrogen supply valve close duration of the timing t3 to t5, the data for estimating the purge flow rate, that is, the electricity-generation consumption hydrogen amount in the hydrogen supply valve close state is computed. In addition, during the purge valve close duration at the timing t4 to t5, the data for estimating the purge flow rate, that is, the flow-out gas amount in the purge valve open state and the electricity-generation consumption hydrogen amount are computed.

If the data amount is sufficient at the timing t5, when the pressurization level until the hydrogen supply valve 33 is closed after it is opened (timing t2 to t3) is equal to the depressurization level until the hydrogen supply valve 33 is opened after it is closed (timing t3 to t5), the purge flow rate is computed based on the obtained data (FIG. 17I)

If the computed purge flow rate is equal to or higher than the threshold value, the purge valve open request turn-on time is reduced only for the purge valve open time (=second predetermined value) at the timing t6 (FIG. 17E). As a result, even when the purge valve open request turn-on time is shorter than the first predetermined value, and the hydrogen supply valve 33 is closed at the timing t7, the purge valve 36 is not opened.

Meanwhile, as illustrated in FIG. 18, if the purge flow rate is lower than the threshold value, the purge valve open request turn-on time is maintained as it is at the timing t6. For this reason, the purge valve open command is turned on at the timing t6, so that the purge valve 36 can be opened at the timing t7. In this manner, if the purge flow rate is lower than the threshold value, an additional purging operation is performed by reducing the purging interval to be shorter than a normal purging interval and opening the purge valve 36 again when the hydrogen supply valve 33 is closed after estimation of the purge flow rate. Therefore, it is possible to manage the hydrogen concentration inside the anode system at which electricity is stably generated.

Figure 19:
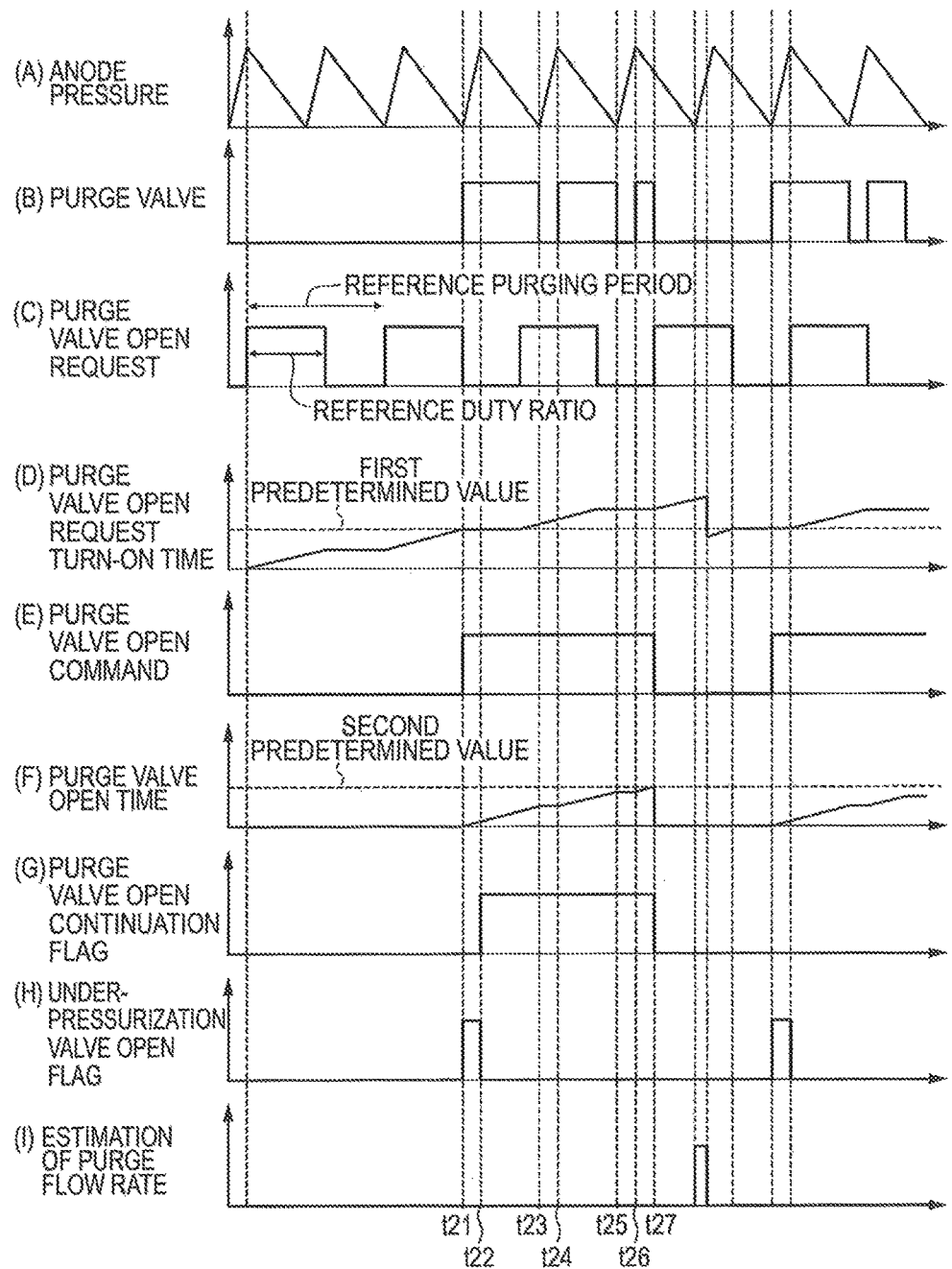
FIG. 19 is a timing chart of the purge control when the purge flow rate is equal to or higher than the threshold value in a high-load operation region.

FIG. 19 is a timing chart illustrating a purge control operation according to this embodiment. FIG. 19 is a timing chart when the purge flow rate is equal to or higher than the threshold value in a high-load operation region.

As illustrated in FIG. 19, when the purge valve open request turn-on time is equal to or longer than the first predetermined value at the timing t21 (FIG. 19D), the purge valve open command is turned on (FIG. 19E). In this case, if the operation region is in the high-load region, it is determined whether or not the purge valve open time is set to zero, or whether or not the under-pressurization valve open flag is asserted through the high-load purging process. At the timing t21, the purge valve open time is set to zero, so that the under-pressurization flag is asserted (FIG. 19H), and the purge valve 36 is opened in the hydrogen supply valve 33 open state (FIG. 19B).

In this manner, by opening the purge valve 36 while opening the hydrogen supply valve 33 during the high load condition, it is possible to reliably discharge the liquid water and reliably discharge the purge gas through the purge valve 36 after the hydrogen supply valve is closed. As a result, it is possible to improve estimation accuracy of the purge flow rate.

As the hydrogen supply valve 33 is closed at the timing t22, the under-pressurization flag is de-asserted (FIG. 19H). In addition, although the hydrogen supply valve 33 is opened at the timing t23, the purge valve open time in this case does not yet reach the second predetermined value (FIG. 19F). For this reason, the purge valve 36 is opened continuously in the hydrogen supply valve 33 close state (FIG. 19B). In addition, the purge valve open time is not reset (FIG. 19F), and the purge valve open command is also maintained at the ON-state (FIG. 19E).

As a result, at the timing t23, it is determined again whether or not the purge valve open time is set to zero, or whether or not the under-pressurization valve open flag is turned on. At the timing t23, since both the conditions are not satisfied, the purge valve 36 is closed while the hydrogen supply valve 33 is opened even in the high-load region (FIG. 19B).

As the hydrogen supply valve 33 is closed at the timing t24, the purge valve 36 is opened (FIG. 19B), and the purge valve open time increases again (FIG. 19F).

At the timing t25, since the hydrogen supply valve 33 is opened, but the purge valve open time does not yet reach the second predetermined value (FIG. 19F), the purge valve 36 is maintained in the open state from the timing t24 (FIG. 19B). In addition, the purge valve open time is not reset (FIG. 19F), and the purge valve open command is maintained in the ON-state (FIG. 19E).

As the hydrogen supply valve 33 is closed at the timing t26, and the purge valve open time reaches the second predetermined value at the timing t27 (FIG. 19F), the purge valve open command is turned off (FIG. 19E), and the purge valve 36 is closed (FIG. 19B).

In this manner, when the interval elapsing after the hydrogen supply valve 33 is closed until the hydrogen supply valve 33 is opened is shortened in the high load region, the purge valve open time does not reach the second predetermined value through a single pulsated depressurization try in some cases. In such a case, the purge valve 36 open operation is performed in a split manner, and only the initial purging is performed in the hydrogen supply valve 33 open state.

The fuel cell system 100 described above according to this embodiment comprises the hydrogen supply valve 33 (supply valve) that controls a supply of the anode gas to the inside of the anode system, the purge valve 36 that discharges the off-gas, the anode pressure sensor 34 (pressure detecting unit) configured to measure a pressure inside the anode system, and the purging amount estimating unit (controller 4) configured to estimate the purging amount of the off-gas discharged from the anode system through the purge valve 36 based on a pressure change inside the anode system during the purge valve 36 close duration in the hydrogen supply valve 33 open state and a pressure change inside the anode system during the purge valve 36 close duration in the hydrogen supply valve 33 close state.

Specifically, the purging amount estimating unit comprises a first estimating unit configured to estimate a gas amount accumulated in the anode system during the purge valve close duration based on a pressure change inside the anode system during the purge valve 36 close duration in the hydrogen supply valve 33 open state, and a second estimating unit configured to estimate a gas amount discharged from the anode system during the hydrogen supply valve 33 close duration based on a pressure change inside the anode system during the purge valve 36 close duration in the hydrogen supply valve 33 close state regardless of the open/close state of the purge valve 36. The purging amount estimating unit estimates the purging amount based on the gas amounts estimated by the first and second estimating units.

The gas amount flowing out from the anode system in the hydrogen supply valve 33 close state is a sum of the purge gas amount discharged from the anode system through the purge valve 36 and the gas amount flowing out from the anode system in the hydrogen supply valve 33 close state regardless of the open/close state of the purge valve 36. In addition, the gas amount flowing out from the anode system in the hydrogen supply valve 33 close state is equal to the gas amount accumulated in the anode system in the hydrogen supply valve 33 open state. Therefore, by computing the gas amount accumulated in the anode system in the hydrogen supply valve 33 open state and the gas amount flowing from the anode system regardless of the open/close state of the purge valve 36 in the hydrogen supply valve 33 close state, and performing subtraction, it is possible to compute the purge gas amount with high accuracy.

The purging amount estimating unit estimates the purging amount when the pressure inside the anode system in the hydrogen supply valve 33 close state decreases to an initial pressure inside the anode system in the hydrogen supply valve 33 open state. For this reason, the purging amount estimating unit may estimate the purging amount when the gas amount accumulated in the anode system in the hydrogen supply valve 33 open state matches the gas amount flowing out from the anode system in the hydrogen supply valve 33 close state.

The fuel cell system 100 according to this embodiment has a purge valve control unit (controller 4) configured to open or close the purge valve 36 based on an open/close state of the hydrogen supply valve 33 and a load of the fuel cell stack 1.

Since the purge valve 36 is closed in the hydrogen supply valve 33 open state, the purge valve control unit can actively make a condition necessary to estimate the purge flow rate. For this reason, it is possible to increase frequency of obtaining data necessary to estimate the purge flow rate and frequency of estimating the purge flow rate.

In addition, the purge valve control unit changes an interval of issuing a valve open command of the purge valve 36 based on a load of the fuel cell stack 1 so as to open the purge valve 36 in the hydrogen supply valve 33 close state when the valve open command is issued.

The purging amount may be small when a load of the fuel cell stack 1 is insignificant. For this reason, when the load of the fuel cell stack 1 is insignificant, it is possible to make the purging amount discharged in a single time constant regardless of the load by increasing the purging interval. In addition, by opening the purge valve 36 as the hydrogen supply valve 33 is closed, it is possible to guarantee the purge valve open state while the anode gas supply stops, and reliably obtain the purging amount necessary to estimate the purge flow rate. Therefore, it is possible to reliably detect a pressure decrease in the purge valve open state.

Since the purge valve control unit closes the purge valve 36 in the hydrogen supply valve 33 close state based on the valve open time of the purge valve 36, the purge valve 36 may be closed as the purge valve open time in the hydrogen supply valve 33 close state reaches a predetermined time (second predetermined value). For this reason, it is possible to reliably obtain the purge valve close state in the hydrogen supply valve 33 close state and reliably detect a pressure decrease in the purge valve close state. As a result, it is possible to reliably estimate the purge flow rate.

The fuel cell system 100 according to this embodiment comprises a determining unit (controller 4) configured to determine whether or not the purging amount is insufficient based on the purging amount estimated by the purging amount estimating unit. In addition, if it is determined that the purging amount is insufficient, the purge valve control unit reduces the interval of issuing the valve open command of the purge valve 36 to be shorter than the interval set based on the load of the fuel cell stack 1.

Specifically, the purge valve control unit computes the reference duty ratio of the purge valve 36 based on the load of the fuel cell stack 1. When an integration value of the valve open request time (purge valve open request turn-on time) is equal to or longer than the first predetermined value, the valve open command of the purge valve 36 is issued. If it is determined that the purging amount is not insufficient, the valve open request time of the purge valve 36 is subtracted from the integration value of the valve open request time. If it is determined that the purging amount is insufficient, the integration value of the valve open request time is maintained as it is.

As a result, when the purging amount is insufficient, an additional purging operation can be performed in addition to the purging operation performed based on the load. Therefore, it is possible to suppress a decrease of the hydrogen concentration inside the anode system and continuously perform stable electricity generation.

In addition, the fuel cell system 100 according to this embodiment comprises a supply valve control unit (controller 4) configured to control an open/close state of the hydrogen supply valve 33 based on a load of the fuel cell stack 1 such that a supply state (during pulsated pressurization) in which the anode gas is supplied to the inside of the anode system by opening the hydrogen supply valve 33 and a supply stop state (during pulsated depressurization) in which the supply of the anode gas to the inside of the anode system stops by closing the hydrogen supply valve 33 are alternatively repeated. In addition, the purging amount estimating unit estimates the purge flow rate based on a change of the pressure inside the anode system by repeating the supply state and the supply stop state through a plurality times. For this reason, for example, even when the load of the fuel cell stack 1 is heavy, and the pulsated depressurization time is short, it is possible to obtain the data for a predetermined time (for example, 0.5 second) necessary to estimate the purging amount or longer from pressure change data of a plurality of pulsation cycles and estimate the purging amount with high accuracy.

Second Embodiment

Next, a second embodiment of this invention will be described. This embodiment is different from the first embodiment in the purging amount estimation method. Hereinafter, a description will be made by focusing on this difference. It is noted that like reference numerals denote like elements for similar functional parts as in the first embodiment, and they will not be described repeatedly.

Figure 20:
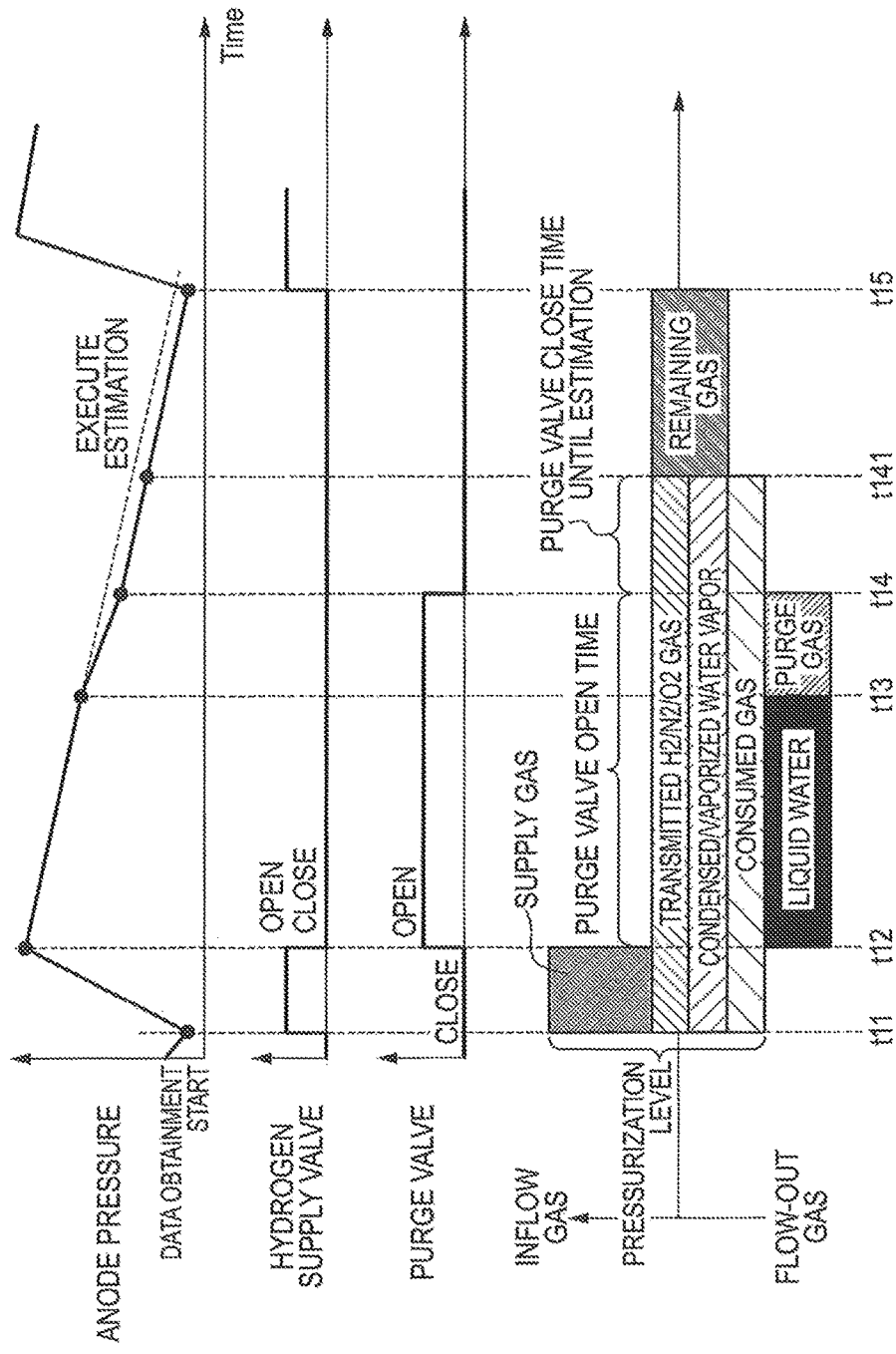
FIG. 20 is a diagram illustrating a purging amount computation method according to a second embodiment of this invention.
Figure 21:
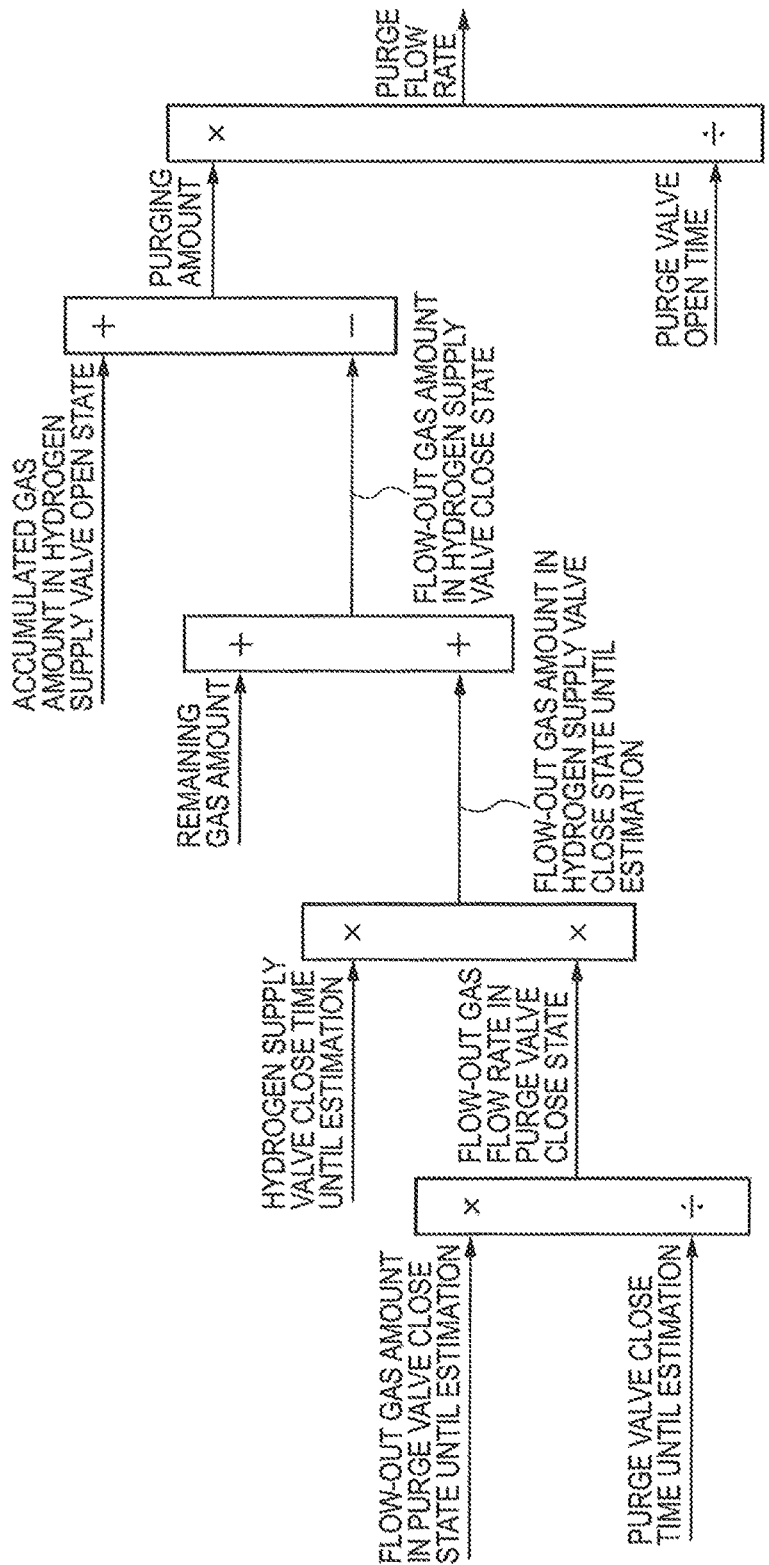
FIG. 21 is a diagram illustrating a purging amount computation method according to the second embodiment of this invention.

FIGS. 20 and 21 are diagrams illustrating a purging amount estimation method according to this embodiment.

In the first embodiment described above, the purging amount (purge flow rate) is estimated based on a fact that the gas amount (gas amount corresponding to the pressurization level) accumulated in the anode system during the purge valve 36 close duration in the hydrogen supply valve 33 open state is equal to the gas amount (gas amount corresponding to the depressurization level) flowing out from the inside of the anode system during the purge valve 36 close duration in the hydrogen supply valve 33 close state. For this reason, a fact that the pressurization level matches the depressurization level is one of prerequisites for estimating the purging amount. That is, that the pressure (anode pressure) inside the anode system in the hydrogen supply valve 33 close state decreases to an initial pressure of the anode system (pressure at the timing t11 in FIG. 20) in the hydrogen supply valve 33 close state is one of the prerequisites for estimating the purging amount.

In comparison, according to this embodiment, the estimation is performed when the data amount for estimating the purging amount is sufficient. That is, the purging amount is estimated when the time for which the purge valve 36 is closed by closing the hydrogen supply valve 33 (timing t141 in FIG. 20) is equal to or longer than a predetermined time (for example, 0.5 second). In this case, as illustrated in FIG. 20, it is sometimes necessary to estimate the purging amount before the pressure inside the anode system in the hydrogen supply valve 33 close state decreases to the initial pressure (pressure at the timing t11 in FIG. 20) inside the anode system when the hydrogen supply valve 33 is opened.

Even in this case, in order to estimate the purging amount, it is necessary to obtain the gas amount flowing out from the inside of the anode system at the timing t12 to t15. Therefore, it is necessary to compute the gas amount flowing out from the inside of the anode system at the timing t141 to t14, that is, the gas amount (hereinafter, referred to as a "remaining gas amount") remaining inside the anode system at the timing t141.

In this regard, according to this embodiment, the remaining gas amount is computed based on a pressure inside the anode system at the timing (timing t141 of FIG. 20) for estimating the purging amount and the initial pressure (pressure at the timing t11 of FIG. 20) inside the anode system when the hydrogen supply valve 33 is opened. Specifically, for example, the remaining gas amount may be computed by obtaining a difference between the two pressure values and referencing a table created in advance through experiments and the like. Alternatively, the remaining gas amount may be obtained by computing changes of the molar amount the gas inside the anode system obtained by applying the anode pressure used to estimate the purging amount and the like to an equation of state of the gas and the molar amount of the gas inside the anode system obtained by applying the anode pressure in the hydrogen supply valve open state and the like.

In addition, as illustrated in FIG. 21, the gas amount flowing out from the inside of the anode system in the hydrogen supply valve close state at the timing t12 to t15 regardless of the open/close state of the purge valve 36 is computed by correcting the gas amount flowing out from the inside of the anode system in the hydrogen supply valve close state at the timing t12 to t141 computed based on a pressure decrease at the timing t14 to t141 using the remaining gas amount. Specifically, the remaining gas amount is added to the gas amount flowing out from the inside of the anode system in the hydrogen supply valve close state at the timing t12 to t141 regardless of the open/close state of the purge valve 36.

According to this embodiment described above, if the purging amount is estimated before the pressure inside the anode system in the hydrogen supply valve 33 close state decreases to the initial pressure inside the anode system when the hydrogen supply valve 33 is opened, the remaining gas amount inside the anode system is estimated based on the pressure inside the anode system used in the estimation and the initial pressure. In addition, the gas amount flowing out from the inside of the anode system in the hydrogen supply valve 33 close state regardless of the open/close state of the purge valve 36 is corrected based on the remaining gas amount.

Even when the purging amount is estimated in this manner, it is possible to estimate the purging amount or the purge flow rate with high accuracy similar to the first embodiment. In addition, it is possible to estimate the purging amount or the purge flow rate even before the pressurization level matches the depressurization level.

Although the purge valve 36 is opened simultaneously when the hydrogen supply valve 33 is closed in the aforementioned embodiment, the purge valve 36 may be opened when a predetermined time (for example, 80 ms) elapses after the hydrogen supply valve 33 is closed. As a result, it is possible to reduce an influence on the purge flow rate from a response delay of the hydrogen supply valve 33 or an overshoot of the detection value of the anode pressure sensor 34 and further improve the estimation accuracy of the purge flow rate.

Although the detection value of the anode pressure sensor 34 is used as the pressure inside the anode system in the aforementioned embodiment, the pressure inside the anode system may be estimated, for example, based on the opening level of the hydrogen supply valve 33 and the like.

Although the pulsating operation for pulsating the anode pressure is performed in the aforementioned embodiment, the fuel cell system may constantly maintain the anode pressure depending on the load of the fuel cell stack. In this case, the purge valve 36 may be opened/closed during a transient time for decreasing the load (anode decrease time). In addition, the anode pressure may be pulsated primarily.

In the aforementioned embodiment, until the purge valve open time reaches the second predetermined value, the purge valve 36 is opened continuously in the hydrogen supply valve 33 close state, so that the purging is performed in a split manner in a high load condition and the like. In comparison, the purging may be performed in a split manner until the purge valve open time reaches the second predetermined value, in the purge valve 36 close state before the hydrogen supply valve 33 is opened.

Although the purge valve 36 is opened in synchronization with the hydrogen supply valve 33 close operation in the aforementioned embodiment, it is not necessary to synchronously perform such an operation.

While embodiments of this invention have been described hereinbefore, the embodiments are just for illustrative purposes for the invention, and they are not intended to limit the spirit and scope of this invention to such specific configurations of the embodiments.

This application claims priority based on Patent Application No. 2014-219717, filed with the Japan Patent Office on Oct. 28, 2014, the entire contents of which are incorporated herein by reference.

The invention claimed is:

1. A fuel cell system having a fuel cell supplied with an anode gas and a cathode gas to generate electricity from the fuel cell depending on a load, comprising:
   a supply valve for supplying the anode gas into an anode system of the fuel cell system;
   a purge valve for discharging an off-gas from the anode system; and
   a controller programmed to estimate or measure a pressure inside the anode system,
   wherein the controller is further programmed to estimate a value of a purging amount of the off-gas discharged from the anode system through the purge valve based on a pressure change inside the anode system during a purge valve close duration in a supply valve open state and a pressure change inside the anode system during the purge valve close duration in a supply valve close state.

2. The fuel cell system according to claim 1, wherein the controller is further programmed to:
estimate a first gas amount accumulated in the anode system during the purge valve close duration based on a pressure change inside the anode system during the purge valve close duration in the supply valve open state, and
estimate a second gas amount flowing out from the anode system based on a pressure change inside the anode system during the purge valve close duration in the supply valve close state, regardless of an open/close state of the purge valve in the supply valve close state, and
the value of the purging amount is estimated based on the first gas amount and the second gas amount.

3. The fuel cell system according to claim 1, wherein the controller is further programmed to estimate the value of the purging amount when the pressure inside the anode system in the supply valve close state decreases to an initial pressure inside the anode system in the supply valve open state.

4. The fuel cell system according to claim 2, wherein the controller is further programmed to
estimate a gas amount remaining in the anode system based on a pressure inside the anode system during the estimation and an initial pressure when the value of the purging amount is estimated before the pressure inside the anode system in the supply valve close state decreases to the initial pressure of the anode system in the supply valve open state, and
correct the second gas amount based on the remaining gas amount.

5. The fuel cell system according to claim 1, wherein the controller is further programmed to
open or close the purge valve based on an open/close state of the supply valve and a load of the fuel cell, and
close the purge valve in the supply valve open state.

6. The fuel cell system according to claim 5, wherein the controller is further programmed to open the purge valve in the supply valve close state with a valve open command of the purge valve being issued by changing an interval of issuing the valve open command based on a load of the fuel cell.

7. The fuel cell system according to claim 6, wherein the controller is further programmed to open the purge valve when a predetermined time elapses after the supply valve is closed.

8. The fuel cell system according to claim 6, wherein the controller is further programmed to close the purge valve in the supply valve close state based on a purge valve open time.

9. The fuel cell system according to claim 6, wherein the controller is further programmed to
determine whether or not the purging amount is insufficient based on the value of the purging amount estimated by the controller, and
reduce an interval of issuing the valve open command of the purge valve to be shorter than an interval set based on a load of the fuel cell if it is determined that the purging amount is insufficient.

10. The fuel cell system according to claim 9, wherein the controller is further programmed to:
compute a valve open request time of the purge valve based on a load of the fuel cell,
issue the valve open command of the purge valve when an integration value of the valve open request time is equal to or longer than a first predetermined value,
subtract the purge valve open time from the integration value of the valve open request time if it is determined that the purging amount is not insufficient, and
maintain the integration value of the valve open request time as it is if it is determined the purging amount is insufficient.

11. The fuel cell system according to claim 1, wherein the controller is further programmed to:
control an open/close state of the supply valve based on a load of the fuel cell such that a supply state in which the anode gas is supplied to the anode system by opening the supply valve and a supply stop state in which the supply of the anode gas into the anode system stops by closing the supply valve are repeated alternately, and
estimate the value of the purging amount based on a pressure change inside the anode system in the supply state and the supply stop state through a plurality of times.

12. A control method of a fuel cell system having a fuel cell supplied with an anode gas and a cathode gas to generate electricity from the fuel cell depending on a load, a supply valve for supplying the anode gas into an anode system of the fuel cell system, a purge valve for discharging an off-gas from the anode system, and a controller programmed to estimate or measure a pressure inside the anode system,
the control method comprising
estimating a value of a purging amount of the off-gas discharged from the anode system through the purge valve based on a pressure change inside the anode system during a purge valve close duration in a supply valve open state and a pressure change inside the anode system during the purge valve close duration in a supply valve close state.

* * * * *